(12) United States Patent
Ito et al.

(10) Patent No.: US 8,391,306 B2
(45) Date of Patent: Mar. 5, 2013

(54) CALCULATION PROCESSING APPARATUS AND METHOD

(75) Inventors: Yoshinori Ito, Tokyo (JP); Masami Kato, Sagamihara (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 12/679,574

(22) PCT Filed: Sep. 12, 2008

(86) PCT No.: PCT/JP2008/066912
§ 371 (c)(1),
(2), (4) Date: Mar. 23, 2010

(87) PCT Pub. No.: WO2009/041350
PCT Pub. Date: Apr. 2, 2009

(65) Prior Publication Data
US 2010/0214936 A1  Aug. 26, 2010

(30) Foreign Application Priority Data
Sep. 26, 2007  (JP) .................................. 2007-250063

(51) Int. Cl.
*H04L 12/28* (2006.01)
*H04L 12/56* (2006.01)

(52) U.S. Cl. ..................................................... 370/412
(58) Field of Classification Search ................... 370/412
See application file for complete search history.

(56) References Cited

U.S. PATENT DOCUMENTS

| | | | |
|---|---|---|---|
| 5,220,559 A | 6/1993 | Tsuzuki et al. | |
| 6,038,337 A | 3/2000 | Lawrence et al. | |
| 7,039,233 B2 | 5/2006 | Mori et al. | |
| 7,065,096 B2 * | 6/2006 | Musoll et al. | 370/412 |
| 7,200,687 B2 * | 4/2007 | Nordstrom et al. | 710/9 |
| 2005/0071521 A1 * | 3/2005 | Nordstrom et al. | 710/9 |
| 2006/0155949 A1 * | 7/2006 | Purushothaman | 711/170 |
| 2006/0294261 A1 * | 12/2006 | Nordstrom et al. | 710/3 |

FOREIGN PATENT DOCUMENTS

| | | |
|---|---|---|
| JP | 3-055658 A | 3/1991 |
| JP | 05-108593 A | 4/1993 |

(Continued)

OTHER PUBLICATIONS

O. Nomura et al., "A Convolutional Neural Network VLSI Architecture Using Algorithms of Projection-Field Model and Weight Decomposition", IEICE Technical Report, Neurocomputing Nov. 20, 2004, vol. 104, No. 474, pp. 25-29.

K. Korekado et al., "An Image Filtering Processor for Face/Object Recognition Using Merged/Mixed Analog-Digital Architecture" Technical Report for IEICE, ICD Jul. 8, 2005, vol. 105, No. 185, pp. 19-23.

*Primary Examiner* — Chuong T Ho
(74) *Attorney, Agent, or Firm* — Fitzpatrick, Cella, Harper & Scinto

(57) ABSTRACT

A calculation processing apparatus, which executes network calculations by a hierarchical network configured by connecting a plurality of logical processing nodes that execute calculations for input data to generate calculation result data, calculates memory sizes of buffers required for the network calculations, based on the configuration of the network calculations, in association with a plurality of types of buffer assignment methods for assigning storage areas for intermediate buffers used to hold calculation result data in correspondence with the plurality of processing nodes which configure the network, and executes the network calculations using buffers assigned by the buffer assignment method, which is selected based on the calculated memory size, in the execution sequence according to that buffer assignment method.

13 Claims, 27 Drawing Sheets

FOREIGN PATENT DOCUMENTS

| | | |
|---|---|---|
| JP | 2679730 B | 11/1997 |
| JP | 10-021406 A | 1/1998 |
| JP | 2002-358500 A | 12/2002 |
| JP | 2005-346472 A | 12/2005 |
| JP | 2007-206887 A | 8/2007 |
| WO | WO 2008/153196 A | 12/2008 |

* cited by examiner

--PRIOR ART--

--PRIOR ART--

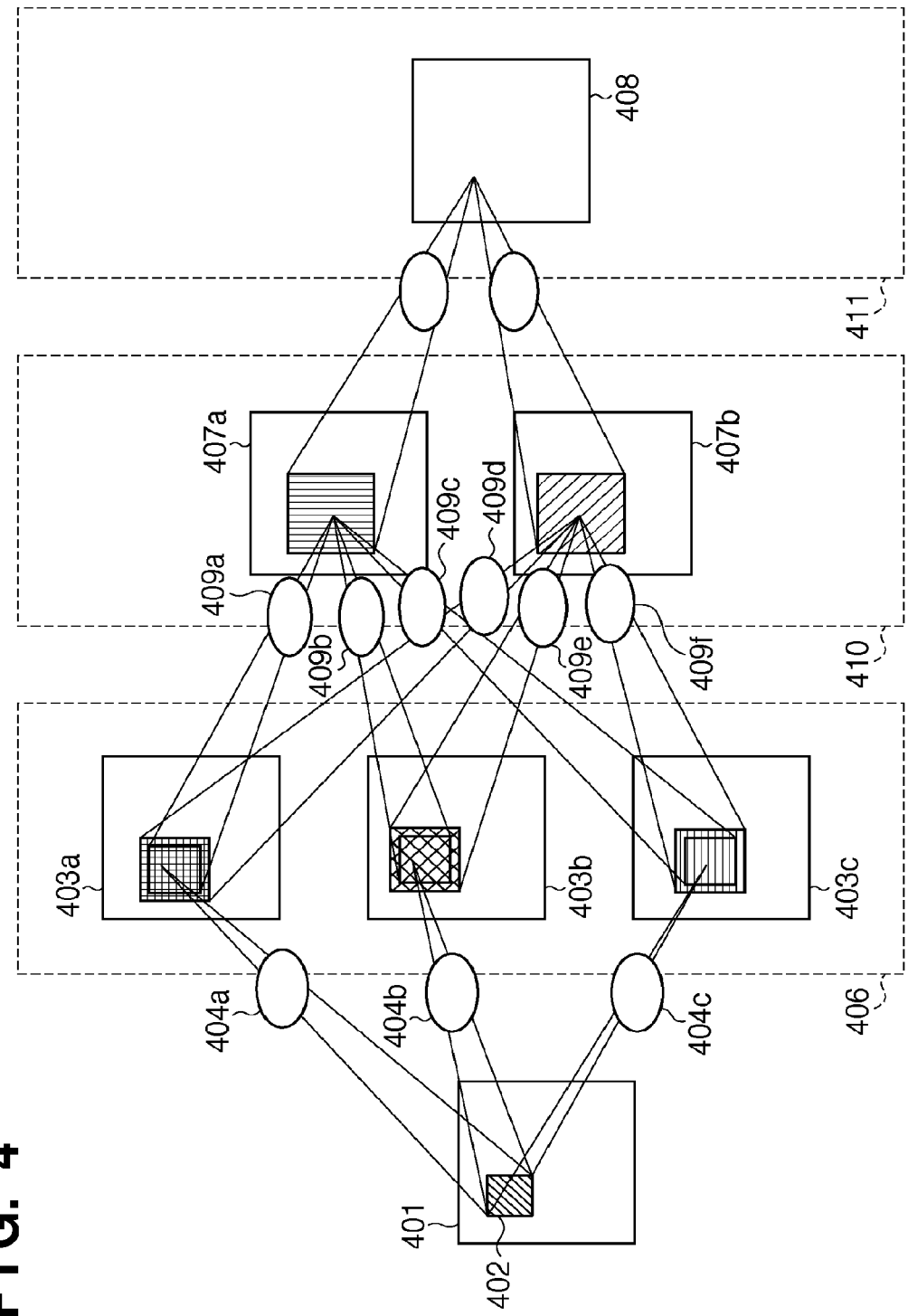
FIG. 4 --PRIOR ART--

PRIMARY FEATURE

SECONDARY FEATURE

TERNARY FEATURE

--PRIOR ART--

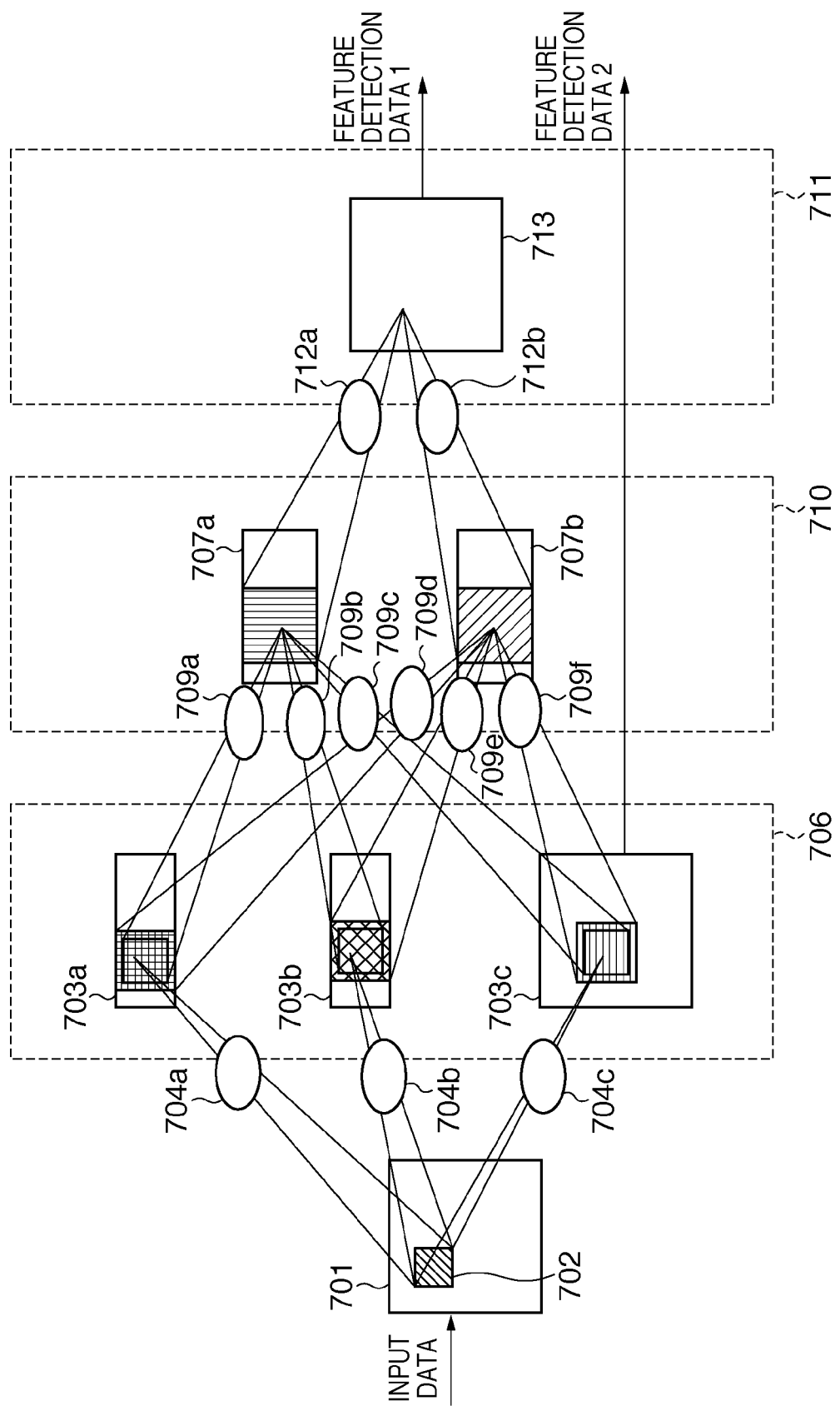

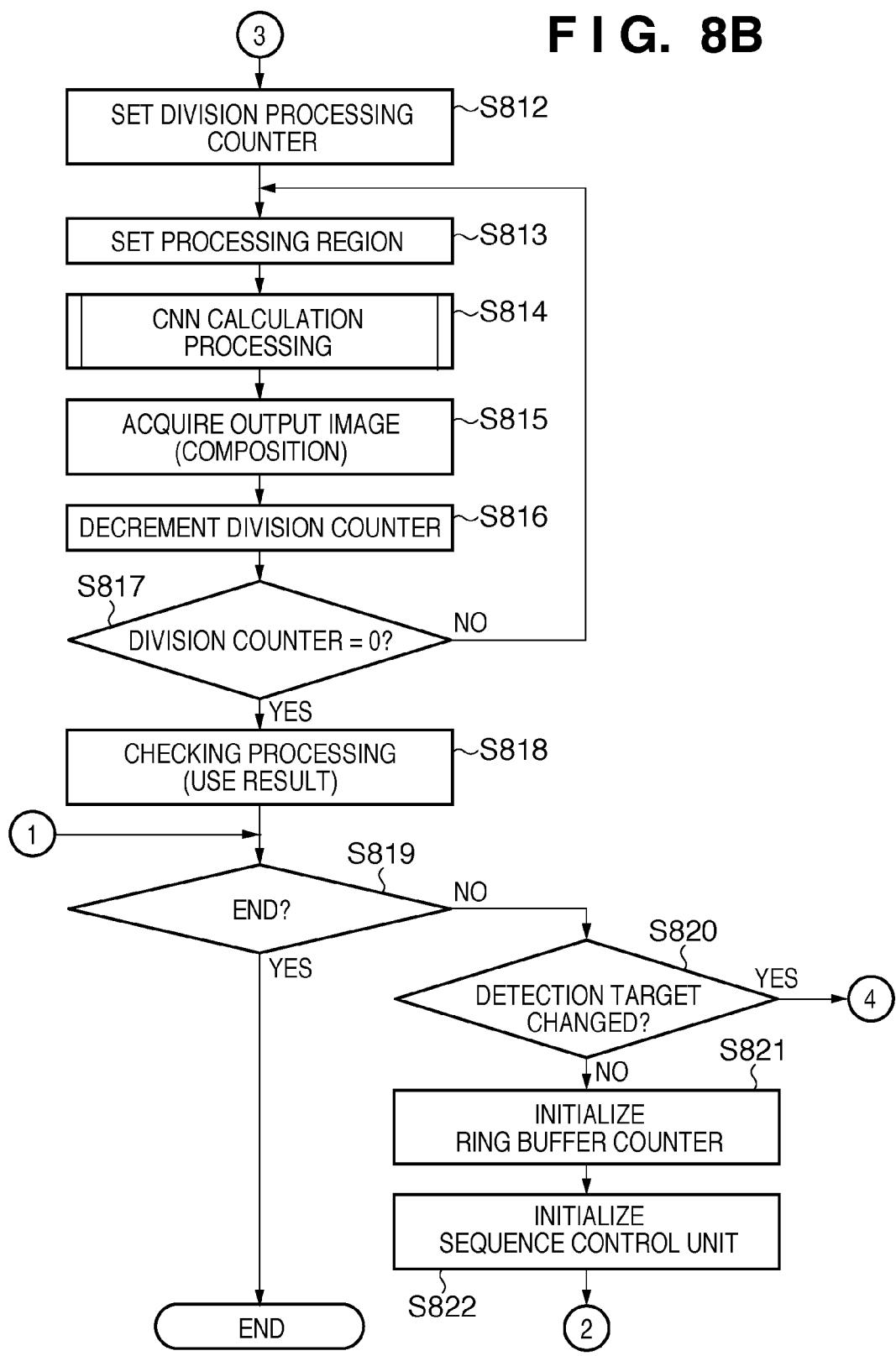

FIG. 9

| TARGET PROCESSING NODE | NUMBER OF ADJACENT LOWER LAYER PROCESSING NODE | ADJACENT LOWER LAYER PROCESSING NODE | CALCULATION TYPE | REFERENCE DATA WIDTH | REFERENCE DATA HEIGHT | PROCESSING START LINE (EFFECTIVE AREA OFFSET) |
|---|---|---|---|---|---|---|
| ZEROTH PROCESSING NODE | | | | 1 | 1 | 0 |
| FIRST PROCESSING NODE | 1 | ZEROTH PROCESSING NODE | CALCULATION 1 | 3 | 3 | 1 |
| SECOND PROCESSING NODE | 1 | ZEROTH PROCESSING NODE | CALCULATION 2 | 3 | 3 | 1 |
| THIRD PROCESSING NODE | 1 | ZEROTH PROCESSING NODE | CALCULATION 3 | 3 | 3 | 1 |
| FOURTH PROCESSING NODE | 3 | FIRST PROCESSING NODE | CALCULATION 4 | 7 | 7 | 4 |
| | | SECOND PROCESSING NODE | CALCULATION 5 | 7 | 7 | |
| | | THIRD PROCESSING NODE | CALCULATION 6 | 7 | 7 | |
| FIFTH PROCESSING NODE | 3 | FIRST PROCESSING NODE | CALCULATION 7 | 9 | 9 | 5 |
| | | SECOND PROCESSING NODE | CALCULATION 8 | 9 | 9 | |
| | | THIRD PROCESSING NODE | CALCULATION 9 | 9 | 9 | |
| SIXTH PROCESSING NODE | 2 | FOURTH PROCESSING NODE | CALCULATION 10 | 11 | 11 | 10 |
| | | FIFTH PROCESSING NODE | CALCULATION 11 | 11 | 11 | |
| SEVENTH PROCESSING NODE | 2 | FOURTH PROCESSING NODE | CALCULATION 12 | 13 | 13 | 11 |
| | | FIFTH PROCESSING NODE | CALCULATION 13 | 13 | 13 | |
| EIGHTH PROCESSING NODE | 2 | SIXTH PROCESSING NODE | CALCULATION 14 | 17 | 17 | 19 |
| | | SEVENTH PROCESSING NODE | CALCULATION 15 | 17 | 17 | |

FIG. 10A

| SEQUENCE NUMBER | PROCESSING NODE NUMBER | PROCESSING LINE |
|---|---|---|
| 1 | 1 | 1 |
| 2 | 2 | 1 |
| 3 | 3 | 1 |
| 4 | 1 | 2 |
| 5 | 2 | 2 |
| 6 | 3 | 2 |
| . | . | . |
| 19 | 1 | 7 |
| 20 | 2 | 7 |
| 21 | 3 | 7 |
| 22 | 4 | 4 |
| . | . | . |
| 27 | 1 | 9 |
| 28 | 2 | 9 |
| 29 | 3 | 9 |
| 30 | 4 | 6 |
| 31 | 5 | 5 |
| . | . | . |
|  | 3 | 19 |
|  | 4 | 16 |
|  | 5 | 15 |
|  | 6 | 10 |
|  | . | . |
|  | 3 | 21 |
|  | 4 | 18 |
|  | 5 | 17 |
|  | 6 | 12 |
|  | 7 | 11 |
|  | . | . |
|  | 3 | 37 |
|  | 4 | 34 |
|  | 5 | 33 |
|  | 6 | 28 |
|  | 7 | 27 |
|  | 8 | 19 |
|  | . | . |
|  | 1 | N−2 |
|  | 2 | N−2 |
|  | 3 | N−2 |
|  | 4 | N−5 |
|  | 5 | N−6 |
|  | 6 | N−11 |
|  | 7 | N−12 |
|  | 8 | N−20 |

FIG. 10B

| SEQUENCE NUMBER | PROCESSING NODE NUMBER | PROCESSING LINE |
|---|---|---|
| 1 | 1 | 1 |
| 2 | 1 | 2 |
| 3 | 1 | 3 |
| 4 | 1 | 4 |
| . | . | . |
| N-4 | 1 | N-4 |
| N-3 | 1 | N-3 |
| N-2 | 1 | N-2 |
| N-1 | 2 | 1 |
| N | 2 | 2 |
| N+1 | 2 | 3 |
| . | . | . |
| 2N-3 | 2 | N-3 |
| 2N-4 | 2 | N-2 |
| . | 3 | 1 |
| . | 3 | 2 |
| . | . | . |
| . | 3 | N-2 |
| . | 4 | 4 |
| . | 4 | 5 |
| . | 4 | 6 |
| . | . | . |
| . | 4 | N-4 |
| . | 4 | N-5 |
| . | 5 | 5 |
| . | 5 | 6 |
| . | . | . |
| . | 5 | N-6 |
| . | 6 | 10 |
| . | 6 | 11 |
| . | . | . |
| . | 6 | N-11 |
| . | 7 | 11 |
| . | 7 | 12 |
| . | . | . |
| . | 7 | N-11 |
| . | 7 | N-12 |
| . | 8 | 19 |
| . | 8 | 20 |
| . | 8 | 21 |
| . | . | . |
| . | 8 | N-19 |
| . | 8 | N-20 |

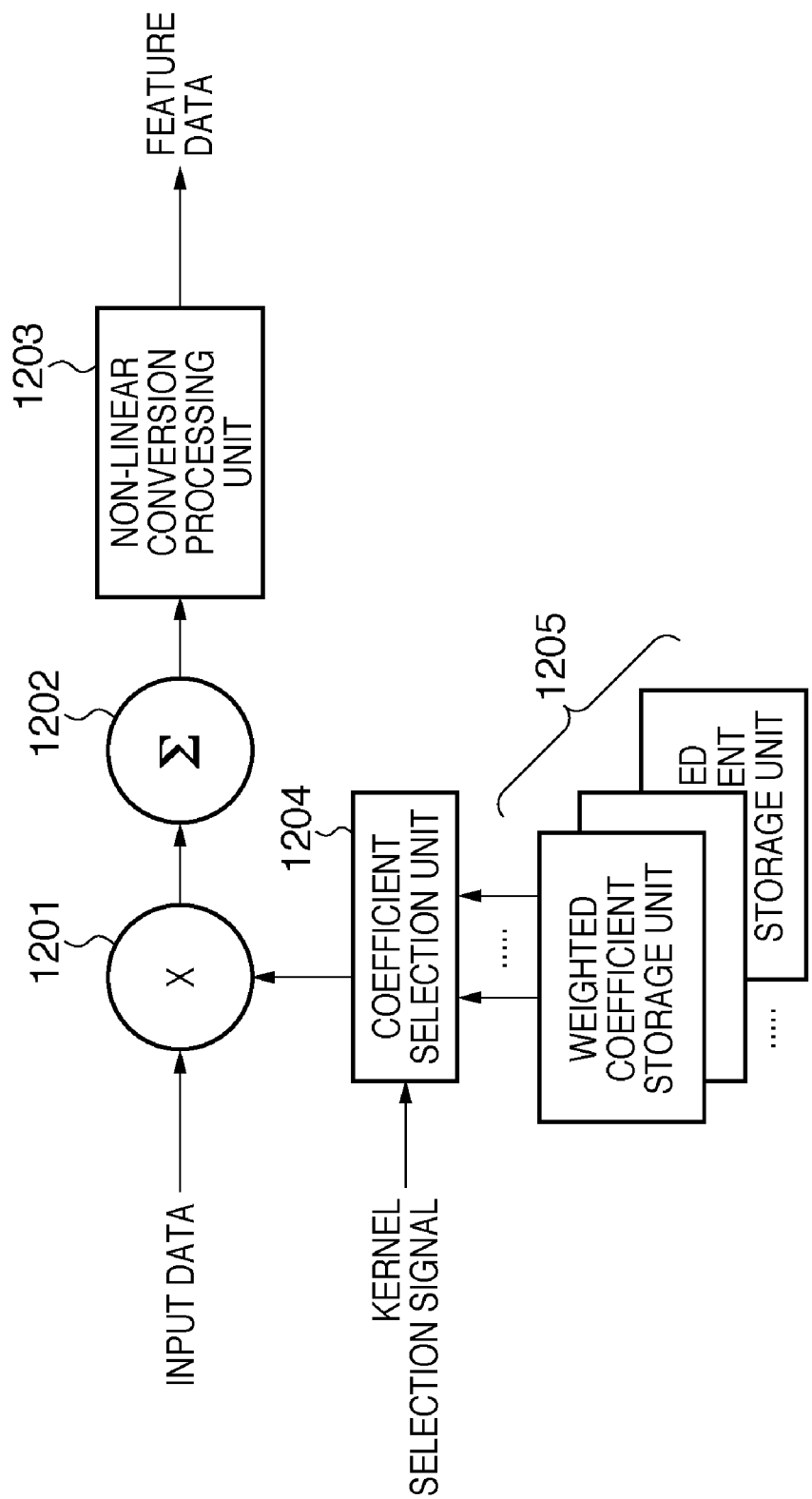

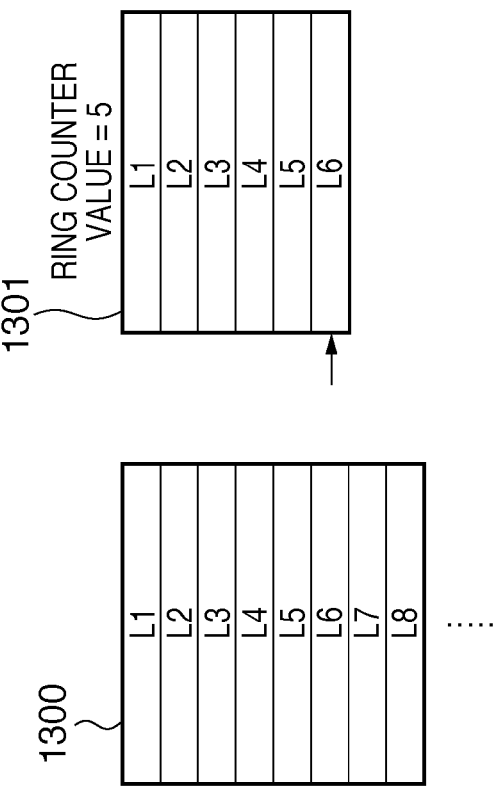
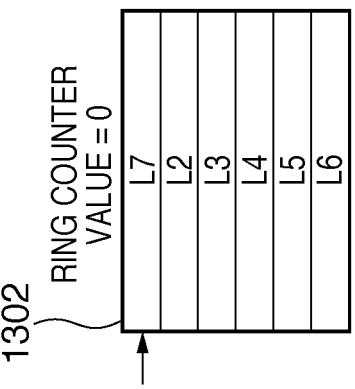
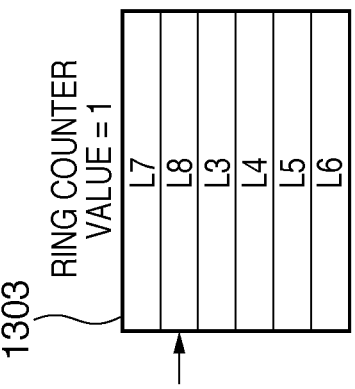

WHEN UNIT CALCULATION TARGET IMAGE AREA IS SHIFTED DOWNWARD BY ONE PIXEL

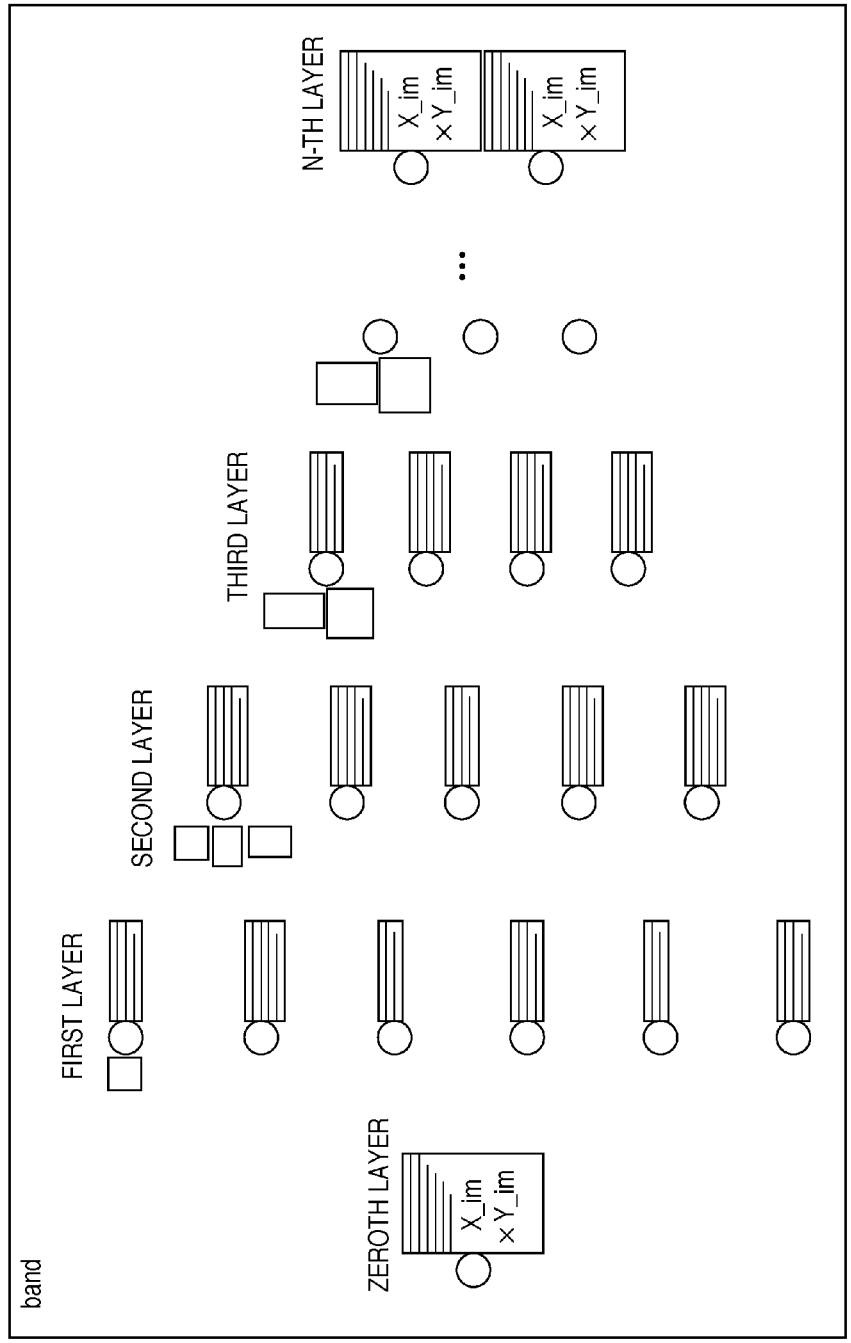

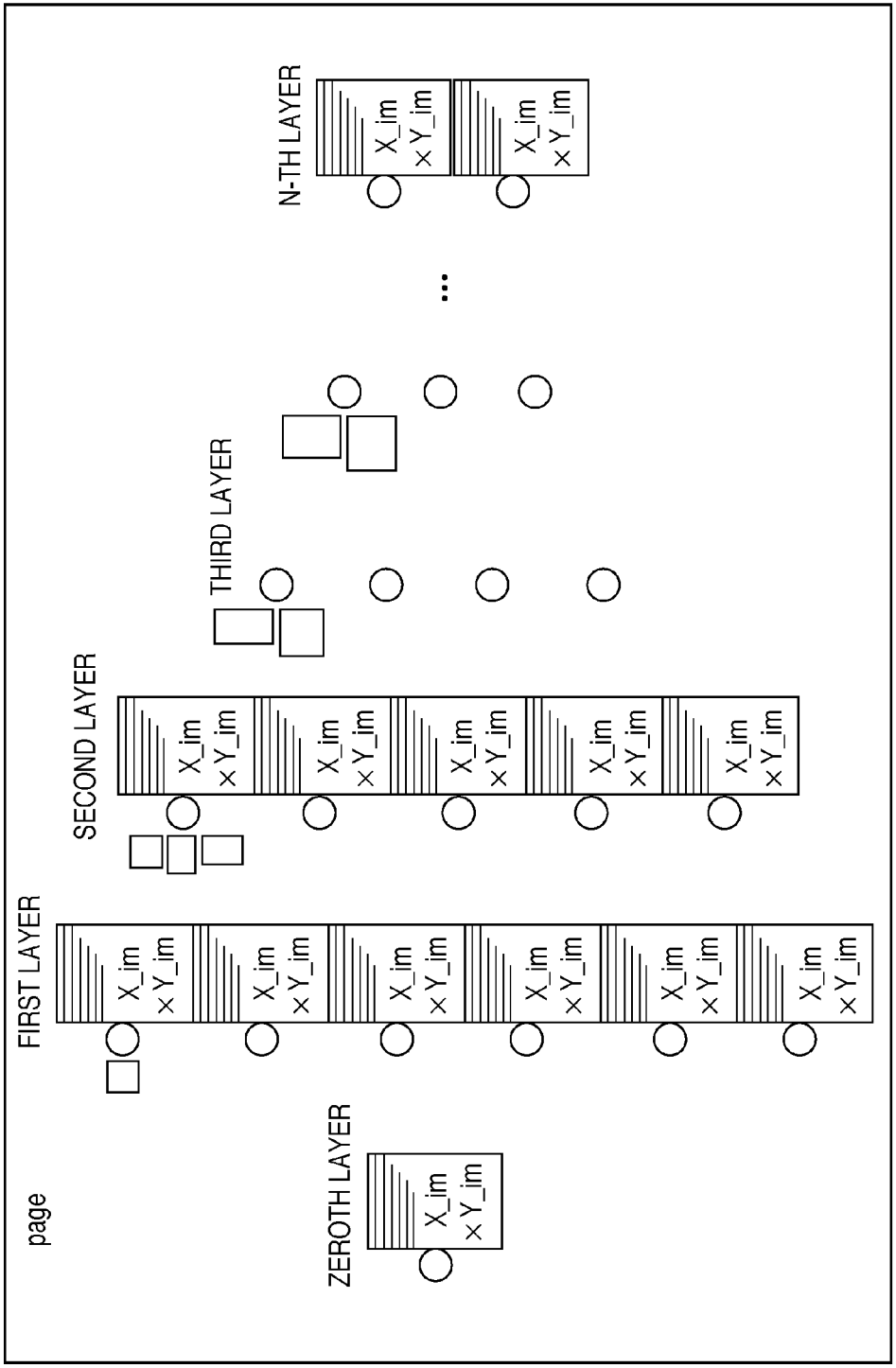

FIG. 25A
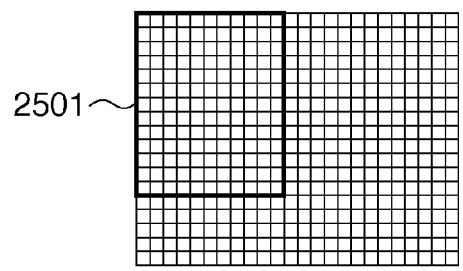
2501
FIG. 25B 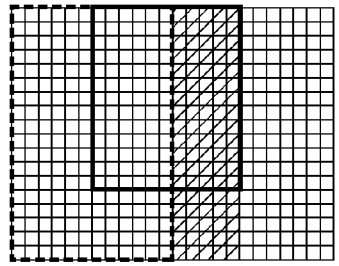 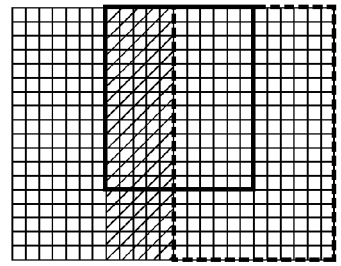 FIG. 25C
FIG. 25D 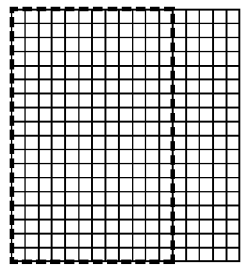 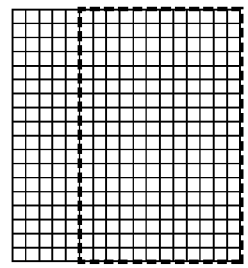 FIG. 25E

CALCULATION PROCESSING APPARATUS AND METHOD

TECHNICAL FIELD

The present invention relates to a calculation processing apparatus and method, which are applicable to, for example, a pattern identification apparatus, pattern identification system, hierarchical filter calculation processing apparatus, and the like, and implement network calculations.

BACKGROUND ART

As applications to a pattern identification system, prediction system, control system, and the like, a signal processing apparatus using a neural network is prevalently used. In general, the neural network is often implemented as software which runs on a microprocessor, and is provided as application software for a personal computer, workstation, and the like.

FIG. 2 is a schematic block diagram showing an example of the arrangement of an image processing apparatus using a general hierarchically coupled neural network. Reference numeral 21 denotes data of a detection target, for example, raster-scanned image data. Reference numeral 22 denotes a calculation unit which detects a predetermined object from the image data 21, and comprises a neural network of three layers in the illustrated example. Reference numeral 23 denotes an output data plane corresponding to the calculation result. The calculation unit 22 executes processing while scanning and referring to a predetermined image area 24 in the image data 21, thereby detecting a detection target which exists in the image. The output data plane 23 is a data plane having the same size as the image data 21 as the detection target. The output data plane 23 stores, in the scan order, detection outputs of the calculation unit 22 which processes all the areas of the image data 21 while scanning them. Since the calculation unit 22 outputs a large value at a position where a target is detected, it can recognize the position of the target in the image plane by scanning the output data plane 23.

In the calculation unit 22, reference numerals 25, 26, and 27 denote layers of the neural network, and a predetermined number of neurons 28 exist in each layer. The first layer 25 has the same number of neurons (nodes) 28 as the number of pixels of a reference image. Respective neurons are feedforward-coupled via predetermined weighted coefficients.

FIG. 3 is a block diagram showing an example of the arrangement of one neuron 28. Reference symbols in_1 to in_n denote input values, which are output values of the previous layer neurons in the second and subsequent layers. An accumulation adder 32 accumulates products of the input values and coefficients w_1 to w_n obtained by learning. A non-linear conversion processing unit 33 non-linearly converts the accumulated sum from the accumulation adder 32 using a logistic function, hyperbolic tangent function (tanh function), or the like, and outputs that conversion result as a detection result "out". Assume that that the weighted coefficients w_1 to w_n required for respective neurons in the hierarchical neural network are determined for respective targets to be detected using a learning algorithm such as back propagation, or the like, which is generally known.

For the purpose of high-performance and low-cost implementation of such hierarchically coupled neural network in an embedded device or the like, an implementation method using analog hardware or digital hardware has been proposed.

Japanese Patent No. 2679730 (patent reference 1) discloses an architecture of a hierarchical structure neural network which implements a multilayered structure using single-layer analog neural network hardware as time division multiplexing. Also, Japanese Patent Laid-Open No. 3-55658 (patent reference 2) discloses an implementation method using digital hardware.

On the other hand, a calculation method using a neural network called Convolutional Neural Networks is known as a method that allows pattern recognition robust against variations of an identification target. The Convolutional Neural Networks will be abbreviated as "CNN" hereinafter. For example, Japanese Patent Laid-Open No. 10-021406 (patent reference 3) and Japanese Patent Laid-Open No. 2002-358500 (patent reference 4) have proposed examples in which CNN calculations are applied to target identification or detection in an image.

FIG. 4 is a block diagram showing the logical network configuration as an example of simple CNN. FIG. 4 shows an example of three-layer CNN in which the number of features of a first layer 406 is 3, that of a second layer 410 is 2, and that of a third layer 411 is 1. Reference numeral 401 denotes image data, which corresponds to raster-scanned image data. Reference numerals 403a to 403c denote feature planes of the first layer 406. The feature plane is an image data plane indicating the results obtained by calculations while scanning data of the previous layer using a predetermined feature extraction filter (the accumulated sum of convolution calculations and non-linear processing). The feature plane is expressed by a plane since it is defined by the detection results for the raster-scanned image data. The feature planes 403a to 403c are generated from the image data 401 by corresponding feature extraction filters. For example, the feature planes 403a to 403c are generated by two-dimensional convolution filter calculations typically corresponding to convolution kernels 404a to 404c, and the non-linear conversion of the calculation results. Note that reference numeral 402 denotes a reference image area required for the convolution calculations.

For example, a convolution filter calculation having a kernel size (the length in the horizontal direction and the height in the vertical direction) of 11×11 processes data by a product-sum calculation given by:

$$\text{output}(x, y) = \sum_{row=-RowSize/2}^{rowSize/2} \sum_{column=-columnSize/2}^{columnSize/2} \text{input}(x+\text{column}, y+\text{row}) \times \text{weight}(\text{column, row}) \quad (1)$$

where
input(x, y): a reference pixel value at coordinates (x, y)
output(x, y): a calculation result at coordinates (x, y)
weight(column, row): a weighted coefficient at coordinates (x+column, y+row)
columnSize=11, rowSize=11: a filter kernel size (the number of filter taps).

The convolution kernels 404a to 404c respectively have different coefficients. Also, the convolution kernels 404a to 404c have different sizes depending on the feature planes.

The CNN calculations generate the feature plane by repeating the product-sum calculation while scanning a plurality of filter kernels for respective pixels, and by non-linearly converting the final product-sum result. Upon calculating the feature plane 403a, since the number of couplings with the previous layer is 1, one convolution kernel 404a is used. On the other hand, upon calculating each of feature planes 407a and 407b, since the number of couplings with the previous layer is 3, the calculation results of three convolution filters 409a to 409c or 409d to 409f are accumulated. That is, the feature plane 407a can be generated by accumulating the outputs from the convolution filters 409a to 409c, and finally executing the non-linear conversion processing of the sum.

Note that the convolution kernels 409a to 409f respectively have different filter coefficients. The convolution kernels 409a to 409c and convolution kernels 409d to 409f respectively have different kernel sizes, as shown in FIG. 4. The basic arrangement of the accumulation of convolution filters and the non-linear conversion processing is the same as that of the neuron shown in FIG. 3. That is, the coefficients of the convolution kernels correspond to the weighted coefficients w_1 to w_n. Upon coupling to a plurality of feature planes of the previous layers like the feature planes 407a, 407b, and 408, the accumulation adder 32 accumulates calculation results of a plurality of convolution kernels. That is, the total number of couplings corresponds to the convolution kernel size×the number of features of the previous layer.

FIGS. 5A to 5C are views for explaining graphic detection processing in the CNN calculations. Reference numerals 51a to 51c denote convolution kernels which illustrate feature extraction targets of the first layer 406, and are learned to respectively extract a horizontal edge and oblique edges. Reference numerals 52a and 52b denote graphics which are extracted by the second layer 410 based on a plurality of feature extraction results of the first layer and their spatial allocation relationships. Reference numeral 53 denotes a graphic to be finally extracted. The graphic 53 is extracted by the third layer 411 based on a plurality of second layer feature extraction results of the second layer 410 and their spatial allocation relationships. Assume that the filter coefficients of the convolution kernels are determined in advance for respective features by learning using a prevalent method such as perceptron learning, back propagation learning, or the like. In object detection, recognition, and the like, a filter kernel having a size as large as 10×10 or more is normally used. In general, convolution kernel sizes are different for respective features.

In this way, the CNN calculations can implement robust pattern detection based on primitive features and their spatial allocation relationships by hierarchically coupling layers while holding the results by respective image planes for respective feature extractions.

As has been described using FIG. 2, in an apparatus for detecting an object in an image, which uses a general hierarchical neutral network, as the memory size required for calculation processing, a buffer memory used to hold respective neuron outputs suffices except for input and output image buffers. That is, if a memory having the predetermined number of bits as many as the number of neurons is provided, desired calculation processing can be executed.

On the other hand, in case of the CNN calculations, since feature extraction is made based on the spatial allocation of a plurality of feature extraction results of the previous layer, data buffers of a predetermined size are required between adjacent layers. For example, in case of the CNN calculation configuration example shown in FIG. 4, the image size×five feature plane buffer memories need to be prepared (feature planes 403a to 403c, and feature planes 407a and 407b) except for input and output image buffers. For this reason, a memory size required for processing becomes larger than a general hierarchical neural network.

The methods described in patent references 3 and 4 are also those which hold the feature extraction results by image planes, and the memory size required for processing is larger than a method using a general hierarchical neural network.

As a result, particularly, in case of hardware implementation, a RAM (Random Access Memory) having a large size needs to be prepared in an LSI, resulting in increases in circuit scale. Even in the case of software implementation, upon implementing in an embedded device, the cost similarly increases due to an increase in memory size required for the system. That is, the memory size that can be used for calculations is a finite value specified by the cost that can be spent for the system.

On the other hand, as a method of avoiding an increase in memory size, a method of dividing input data into areas and inputting the divided data is used. However, when calculations for a broad reference area are to be hierarchically processed, since data to be divisionally input need to overlap each other over a broad range, processing target areas consequently increase, thus lowering the processing efficiency and processing speed.

DISCLOSURE OF INVENTION

The present invention has been made to solve such problems, and has as its object to efficiently implement, using a limited memory size, calculation processing executed by a plurality of processing nodes connected via a network structure such as CNN calculations.

According to one aspect of the present invention, there is provided a calculation processing apparatus for executing a network calculation by a network configured by connecting a plurality of logical processing nodes, the apparatus comprising: calculation means for calculating memory sizes of storage areas for buffers used to hold calculation result data by the plurality of processing nodes for a plurality of types of buffer assignment methods of assigning the storage areas to a memory, on the basis of a configuration of the network; selection means for selecting one of the plurality of types of buffer assignment methods based on the memory sizes calculated by the calculation means; and execution means for controlling the respective processing nodes to execute calculations in the network calculations using the buffers assigned by the buffer assignment method selected by the selection means.

Also, according to another aspect of the present invention, there is provided a calculation processing method for executing a network calculation by a network configured by connecting a plurality of logical processing nodes, the method comprising: a calculation step of calculating memory sizes of storage areas for buffers used to hold calculation result data by the plurality of processing nodes for a plurality of types of buffer assignment methods for assigning the storage areas to a memory, on the basis of a configuration of the network; a selection step of selecting one of the plurality of types of buffer assignment methods based on the memory sizes calculated in the calculation step; and an execution step of controlling the respective processing nodes to execute calculations in the network calculations using the buffers assigned by the buffer assignment method selected in the selection step.

Further features of the present invention will become apparent from the following description of exemplary embodiments with reference to the attached drawings.

BRIEF DESCRIPTION OF DRAWINGS

FIG. 4 is a diagram for explaining an example of the network configuration of CNN;

FIG. 7 is a diagram for explaining the network configuration of the CNN according to the embodiment;

FIGS. 8A and 8B are a flowchart for explaining the operation of the image processing apparatus according to the first embodiment;

FIG. 9 is a view showing an example of the data configuration of a network configuration information table;

FIGS. 10A and 10B are views showing examples of the data configuration of a sequence information table;

FIG. 12 is a block diagram for explaining an example of the arrangement of a calculation unit 101;

FIGS. 13A to 13D are views for explaining an example of a ring buffer;

FIG. 23 is a view showing an example of an intermediate buffer assignment state based on a band buffer method;

FIG. 24 is a view showing an example of an intermediate buffer assignment state based on a page buffer method;

FIGS. 25A to 25F are views showing an example of division processing according to the embodiment;

BEST MODE FOR CARRYING OUT THE INVENTION

Exemplary embodiments of the present invention will now be described in detail in accordance with the accompanying drawings.

<First Embodiment>

Figure 6:
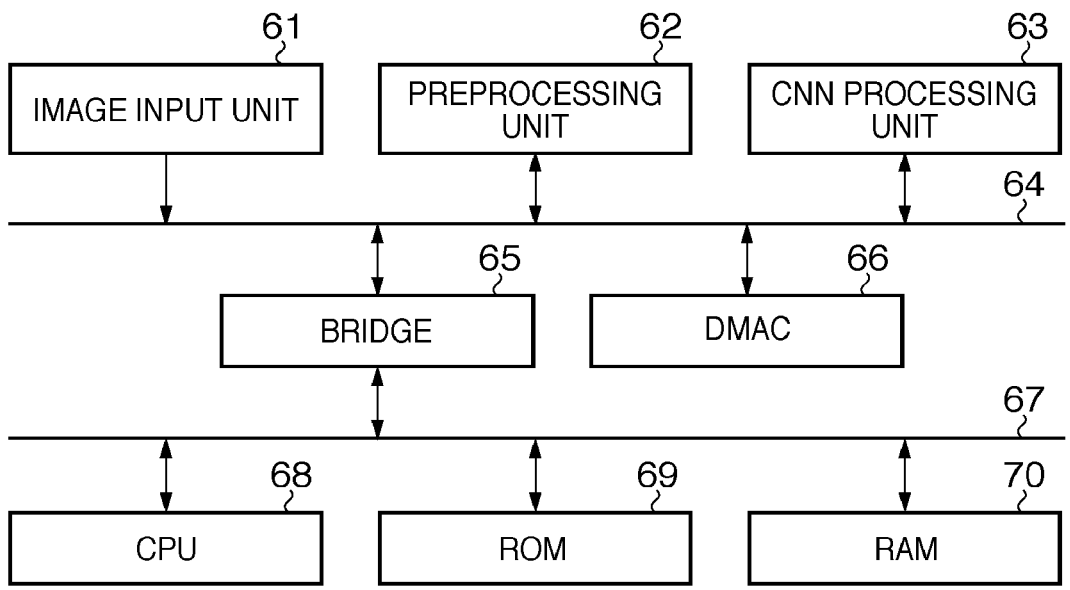
FIG. 6 is a block diagram for explaining the arrangement of an image processing apparatus using hierarchical calculation processing according to the embodiment.

FIG. 6 is a block diagram showing an example of the arrangement of a pattern detection apparatus, which comprises a hierarchical calculation processing circuit according to the first embodiment. This apparatus is an image processing apparatus having a function of detecting a specific object (image pattern) in image data. Referring to FIG. 6, reference numeral 61 denotes an image input unit, which comprises an optical system and a photoelectric conversion device such as a CCD (Charge-Coupled Device) or CMOS (Complementary Metal Oxide Semiconductor) sensor, or the like. Also, the image input unit 61 includes a driver circuit for controlling the photoelectric conversion device, an AD converter, a signal processing circuit for controlling various kinds of image correction, a frame buffer, and the like. Reference numeral 62 denotes a preprocessing unit, which executes various kinds of preprocessing required to efficiently execute detection processing. More specifically, the preprocessing unit 62 processes image data conversion such as color conversion processing, contrast correction processing, and the like by hardware. Reference numeral 63 denotes a CNN processing unit, which includes a hierarchical calculation processing circuit according to this embodiment, and serves as a feature detection processing unit. Note that details of the CNN processing unit 63 will be described later with reference to FIG. 1. Reference numeral 66 denotes a DMAC (Direct Memory Access Controller), which controls data transfer between the respective processing units on an image bus 64 and that between devices on the image bus 64 and a RAM 70 on a CPU bus 67. Reference numeral 65 denotes a bridge, which provides a bridge function between the image bus 64 and CPU bus 67. Reference numeral 68 denotes a CPU, which controls the operation of this apparatus as a whole. Reference numeral 69 denotes a ROM (Read Only Memory), which stores instructions that specify the operations of the CPU 68 and parameter data required for various calculations. For example, the ROM 69 stores weighted coefficients, network coupling information, sequence information, and the like required for the operation of the CNN processing unit 63. Reference numeral 70 denotes a memory (RAM: Random Access Memory) required for the operation of the CPU 68. The RAM 70 comprises a memory having a relatively large capacity such as a DRAM (Dynamic RAM) or the like. The CPU 68 can access various processing units on the image bus 64 via the bridge 65. By isolating the image bus 64 and CPU bus 67, the operations of the respective processing units such as the image input unit 61, preprocessing unit 62, and CNN processing unit 63 implemented by hardware and that of the CPU 68 can be parallelly executed at the same time.

Figure 14:
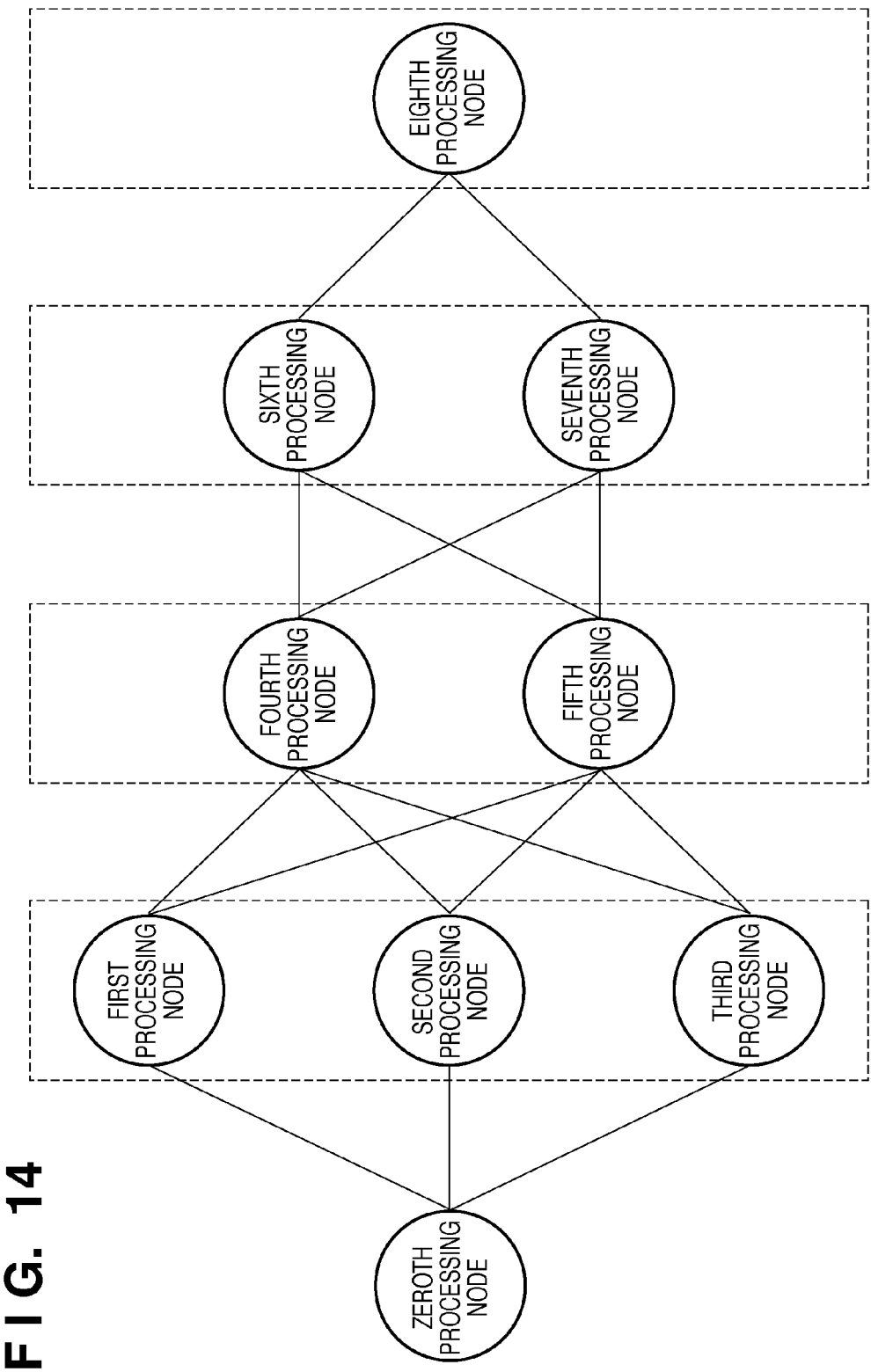
FIG. 14 is a view for explaining the logical connection configuration of processing nodes.

The pattern detection apparatus which comprises the hierarchical calculation processing circuit in FIG. 6 is used to make hierarchical calculations like Convolutional Neural Networks (to be abbreviated as CNN hereinafter), as shown in, for example, FIG. 14. In FIG. 14, a processing node indicates a block which executes processing for obtaining convolution calculation results from a target image of convolution calculations and convolution kernels. Note that FIG. 14 illustrates a zeroth processing node for the sake of convenience. Normally, the zeroth processing node does not execute any processing, and inputs an input image to first to third processing nodes. For example, a fourth processing node in FIG. 14 executes convolution calculations by applying convolution kernels respectively having different coefficients to the outputs from the first to third processing nodes. The fourth processing node sums up these convolution calculation results, and non-linearly converts the sum, thus obtaining its calculation result.

When the CNN shown in FIG. 14 is applied to the CNN processing unit 63, calculations specified by respective processing nodes are executed by time-divisionally using the calculation processing unit among respective processing nodes. For example, CNN calculations are executed like that calculations specified by the first processing node are executed first, those specified by the second processing node are then executed, and so forth. That is, there is a plurality of processing nodes, which configure the CNN, to configure logical networks, but there is only one physical calculation processing unit, which executes calculations specified by the processing nodes.

Figure 1:
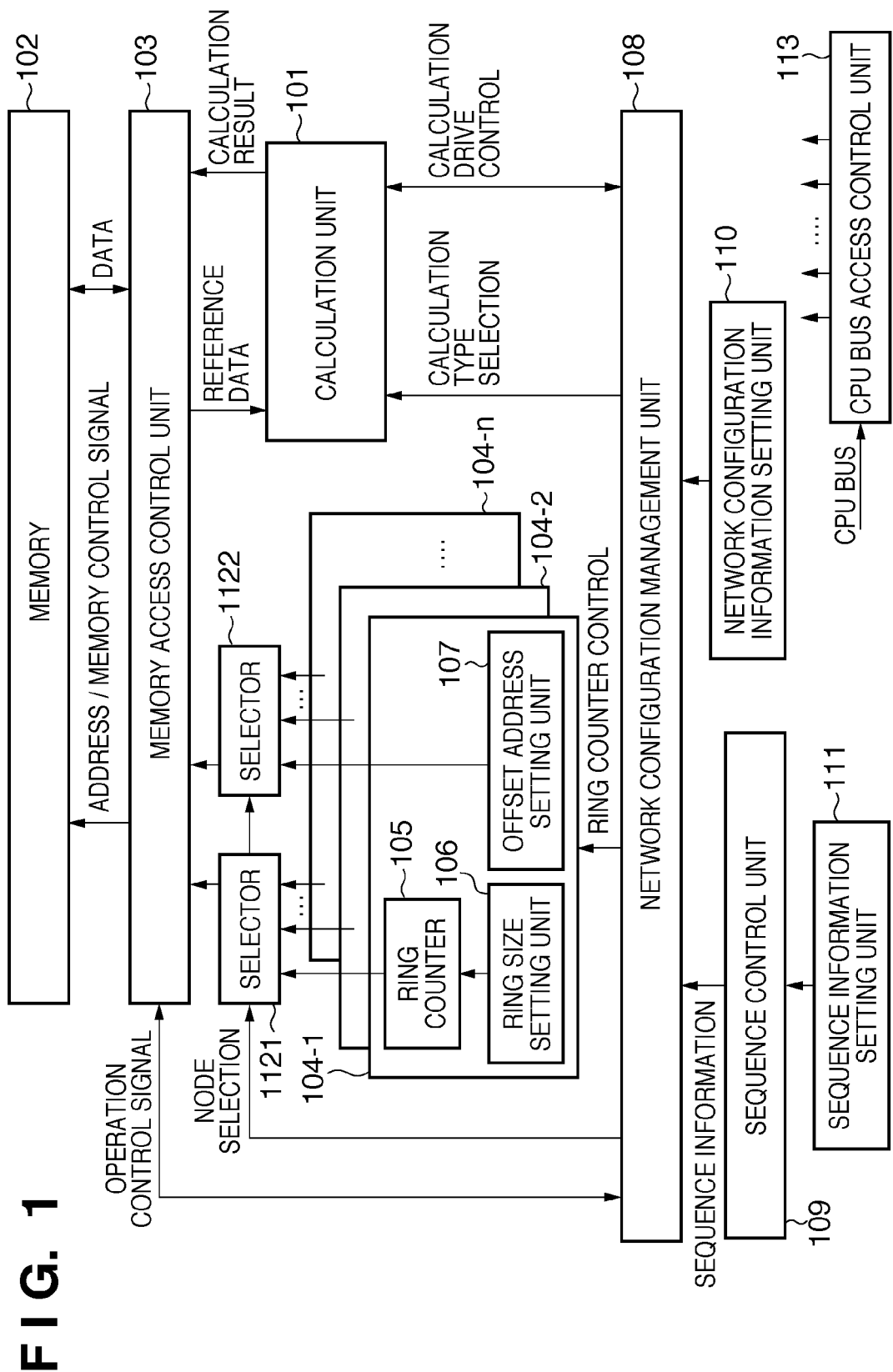
FIG. 1 is a block diagram for explaining the arrangement of a hierarchical calculation processing apparatus according to the first embodiment.
Figure 2:
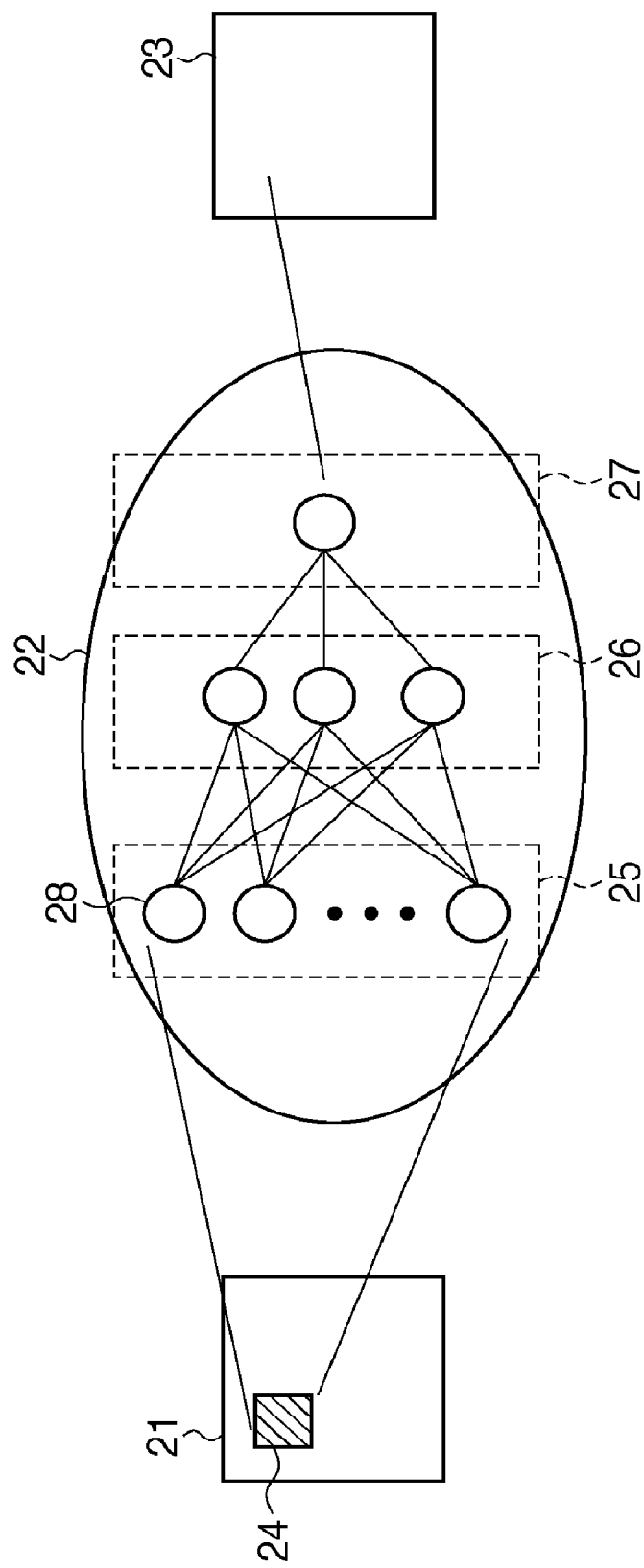
FIG. 2 is a block diagram for explaining an example of the configuration of a hierarchically coupled neural network.
Figure 3:
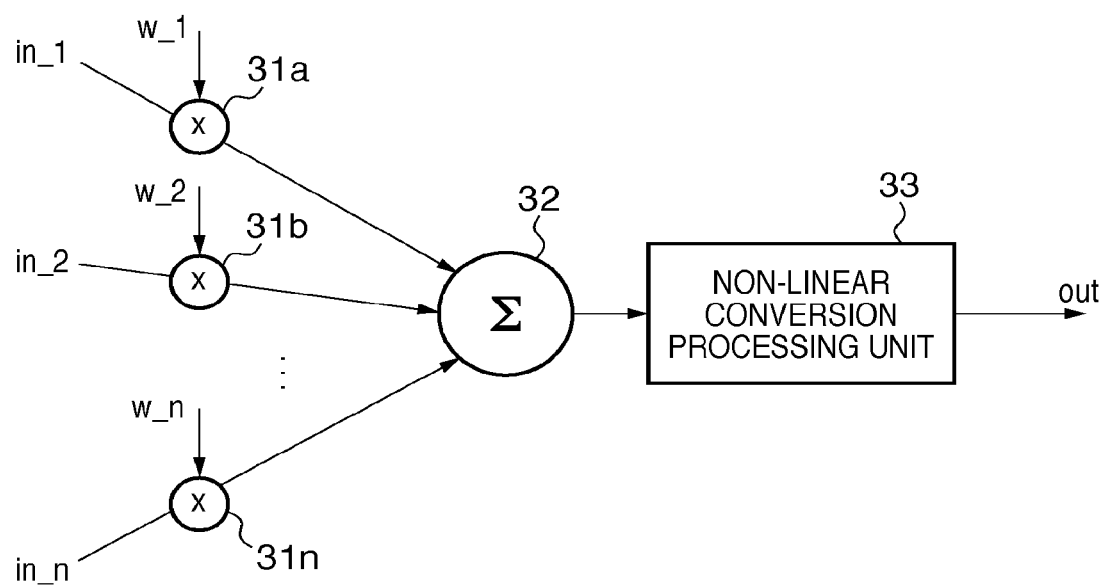
FIG. 3 is a block diagram showing the configuration of a neuron.
Figure 5A:
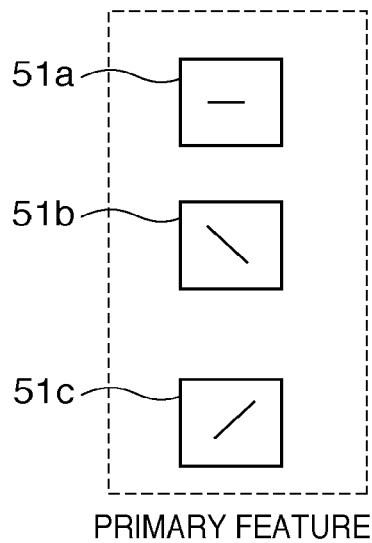
FIGS. 5A to 5C are views for explaining an example of feature extraction of the CNN.
Figure 5B:
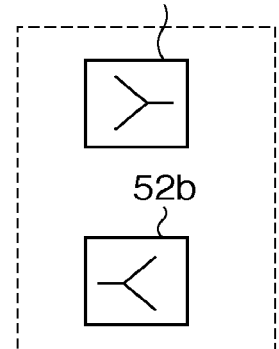
Figure 5C:
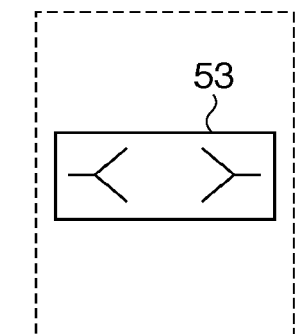

FIG. 1 is a block diagram for explaining details of the CNN processing unit 63. Referring to FIG. 1, reference numeral 101 denotes a calculation unit, which executes convolution calculations and non-linear processing for a predetermined data group. FIG. 12 shows an example of the calculation unit 101. Referring to FIG. 12, reference numeral 1201 denotes a multiplier, which multiplies input data, which is input in synchronism with a kernel selection signal, by a weighted coefficient, which is selected and output by a coefficient selection unit 1204 from weighted coefficient storage units 1205 in accordance with the kernel selection signal. Reference numeral 1202 denotes an accumulation adder, which accumulates the outputs from the multiplier 1201 for a predetermined period of time. Reference numeral 1203 denotes a non-linear conversion processing unit, which non-linearly converts the accumulation result using a logistic function or tanh function. The non-linear conversion is implemented by, for example, a function table which enumerates predetermined function values with respect to respective input values. Reference numeral 1205 denotes weighted coefficient storage units, which store a plurality of weighted coefficient data according to detection targets and processing nodes. The weighted coefficient storage units 1205 are configured by, for example, a RAM or the like. Reference numeral 1204 denotes a coefficient selection unit, which sequentially reads out corresponding weighted coefficients from the storage units in accordance with a kernel selection signal designated by a network configuration management unit 108.

Referring back to FIG. 1, reference numeral 102 denotes a work memory (to be simply referred to as a memory hereinafter), which stores an input image, feature extraction results of intermediate layers, final detection result, and the like. This embodiment uses, as the memory 102, an SRAM (Static RAM) that allows high-speed random accesses, so as to speed up the convolution calculations.

Reference numeral 103 denotes a memory access control unit, which controls accesses and generation of addresses, and executes read/write signal control, direction control of a data bus, and the like, with respect to the memory 102. The memory access control unit 103 accesses the memory 102 in accordance with outputs from ring buffer setting units 104-1 to 104-n.

Reference numerals 104-1 to 104-n denote a plurality of ring buffer setting units, which are used to allow respective processing nodes to respectively use the memory 102 as ring buffers. An arbitrary one of the ring buffer setting units 104-1 to 104-n will be described as a ring buffer setting unit 104 hereinafter. One ring buffer setting unit 104 is prepared for each logical processing node of the CNN calculations. The ring buffer setting unit 104 comprises a ring size setting unit 106 for designating the size of a ring buffer, a ring counter 105 for holding the operation status of the ring buffer, and an offset address setting unit 107 for determining a physical address on the memory 102. The outputs from the ring buffer setting unit 104 are selected by selectors 1121 and 1122, and are provided to the memory access control unit 103. With this arrangement, storage areas for intermediate buffers used to hold calculation result data are assigned to the memory 102 in correspondence with the plurality of processing nodes that configure the network. Details will be described later.

Reference numeral 108 denotes a network configuration management unit, which controls operations so as to implement the logical hierarchical network processing using one calculation unit 101. A network configuration information setting unit 110 holds, as table data (to be referred to as a configuration information table hereinafter), configuration information that designates a logical hierarchical coupling relationship. The configuration information table is configured by a register or RAM. The network configuration management unit 108 sequentially controls the operations of the memory access control unit 103 and calculation unit 101 in accordance with this configuration information table, thereby implementing the calculation processing of the hierarchical network to have a predetermined unit calculation (to be described later) as a base.

A sequence control unit 109 controls the execution sequence of unit calculations by respective processing nodes in accordance with sequence information stored in a sequence information setting unit 111. In this embodiment, calculation processing for obtaining an output of one line unit is defined as a predetermined calculation processing unit (unit calculation). That is, by time-divisionally executing the processing while switching logical processing nodes for respective lines, the hierarchical network calculations are carried out. The sequence information setting unit 111 is configured by a RAM or the like, which holds the sequence information.

Reference numeral 113 denotes a CPU bus access control unit, which is a bus interface required for the CPU 68 to access various registers and memories in the CNN processing unit 63. The CPU 68 can write, via this interface, various setting data:
- the buffer sizes in the ring size setting units 106;
- the configuration information table in the network configuration information setting unit 110;
- the sequence information in the sequence information setting unit 111;
- the weighted coefficient data in the weighted coefficient storage units 1205 of the calculation unit 101; and so forth.

The predetermined unit calculation in this embodiment will be described below with reference to FIGS. 22A and 22B. As described above, the predetermined unit calculation in this embodiment is convolution calculation processing for each line executed using the calculation unit 101. However, FIGS. 22A and 22B show a case in which one processing node executes convolution calculations to have a calculation output image (or an input image to the network) as a calculation target image, and non-linear conversion is also omitted, for the sake of simplicity.

Figures 22A, 22B:
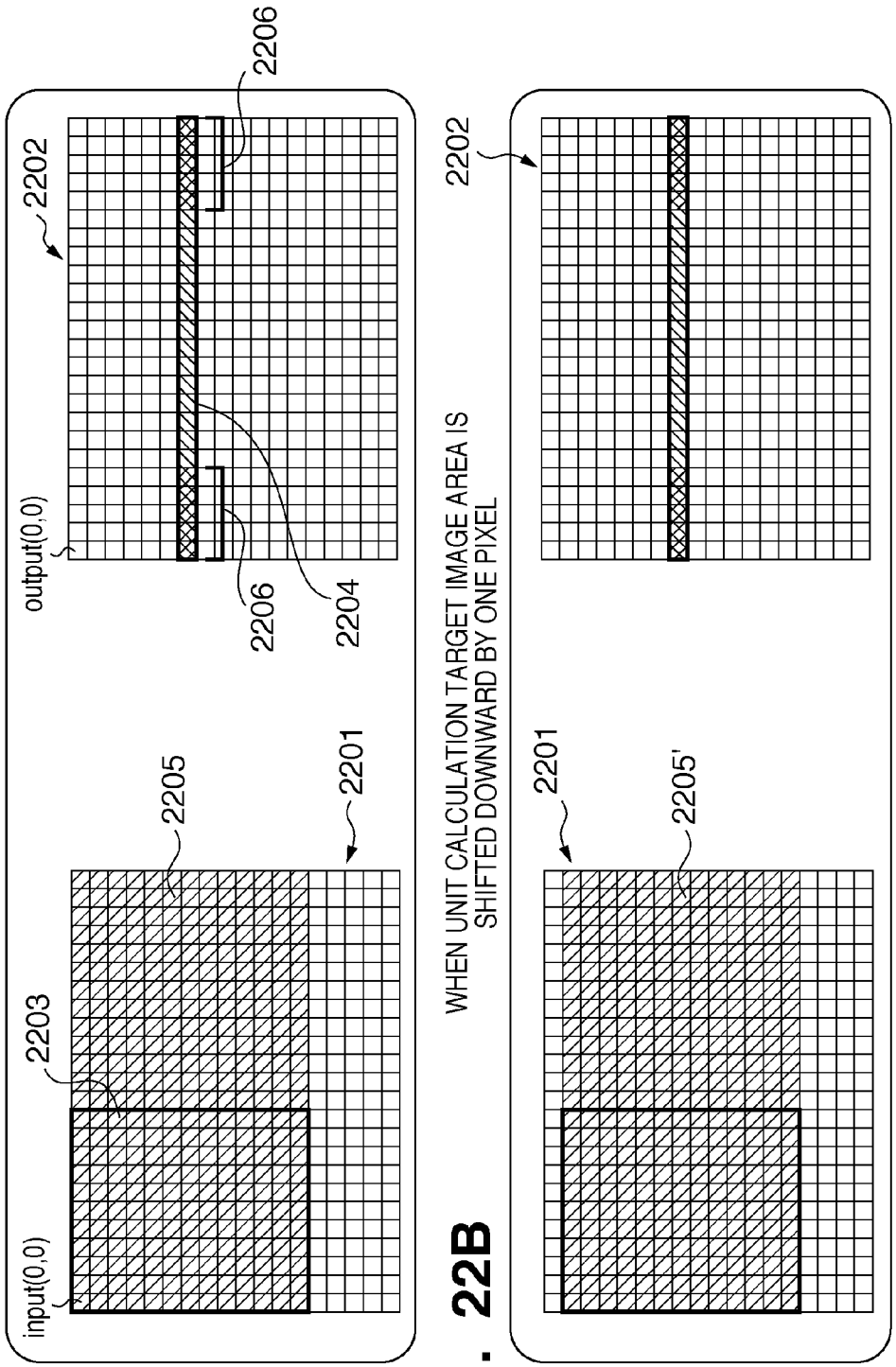
FIGS. 22A and 22B are explanatory views illustrating a state in which the calculation unit 101 executes processing for respective lines.

Referring to FIG. 22A, reference numeral 2201 denotes a calculation target image (reference image). One minimum box illustrated in the calculation target image 2201 indicates a pixel (input(x, y), x: a horizontal position, y: a vertical position) of a calculation target image as an input image expressed in a raster-scan order or a calculation result image in the processing node of the previous layer. Reference numeral 2202 denotes a calculation result image. One minimum box illustrated in the calculation result image 2202 indicates a calculation result pixel in the raster-scan order (output (x, y), x: a horizontal position, y: a vertical position).

An area 2203 bounded by the bold frame in the calculation target image 2201 indicates a reference image area upon processing the convolution calculations at a position output (6, 7). The area 2203 indicates a case in which the convolution kernel size is defined by "11" in the horizontal direction and "13" in the vertical direction.

An area 2204 bounded by the bold frame in the calculation result image 2202 indicates a result area obtained upon execution of a unit calculation (calculation for one row in the horizontal direction) for the calculation target image 2201. Note that cross-hatched areas 2206 in the area 2204 indicate pixels in surrounding areas (areas that do not undergo any calculation) which are generated depending on the convolution kernel size. That is, a reference image area where the calculations at the position output (5, 7) are to be made is defined by shifting the area 2203 to the left by one pixel. However, since such area protrudes from the calculation target image 2201 (reference area), some reference pixels are not available. Note that how to handle these surrounding areas (invalid areas) (to delete, to embed a default value, or the like) in the hierarchical processing is not an essential matter in the present invention. In this case, for example, assume that a default value is embedded. Note that lines above the area 2204 similarly become an invalid area.

As can be seen from FIG. 22A, upon executing a unit calculation for one line, at least an area 2205 is required as a necessary area of the calculation target image 2201. The area 2205 is illustrated as a hatched area in FIG. 22A, and is required to have the horizontal size which is the same as that of the calculation target image 2201, and the vertical size which is the same as that of the convolution kernel. For the sake of descriptive convenience, this area will be referred to as a unit calculation target image area 2205. The convolution calculations can be made for the entire area of the calculation target image 2201 by executing the unit calculation indicated by the area 2204 while shifting the unit calculation image target area 2205. For example, FIG. 22B shows a case in which the unit calculation is executed for a unit calculation target image area shifted downward by one pixel. At this time, whether or not a certain unit calculation can be executed depends on whether or not pixel data of a unit calculation target image area 2205' of that unit calculation are calculated by a processing node of the previous layer, and the calculation results are output. Of course, in case of a processing node which uses a plurality of reference images as inputs in calculations, pixel data of unit calculation target image areas for all the reference images need to be output.

FIG. 7 is a view for explaining an example of the operation when this embodiment is applied to the CNN network explained using FIG. 4.

Referring to FIG. 7, reference numeral 701 denotes an input layer, to which detection target image data having a predetermined size is input. Reference numerals 706, 710, and 711 respectively denote first, second, and third layers. Reference numeral 702 denotes a reference image area, which is required for calculations by convolution kernels 704a to 704c. Reference numerals 703a to 703c denote memory areas which store calculation outputs of the first layer 706. That is, the memory areas 703a to 703c respectively store the results of convolution calculations and non-linear conversion by the convolution kernels 704a to 704c with respect to an input plane of the input layer 701. The feature planes as the calculation result of the first layer are data planes each having the same size as the input layer 701. However, the feature planes are stored in the memory areas 703a and 703b which serve as ring buffers having a predetermined height. These ring buffers are band buffers which have the same width as the input image and are circulated for respective lines.

FIGS. 13A to 13F are explanatory views illustrating the operation of the ring buffer of this embodiment. Assume that the height (circulation count) of the ring buffer is 6 for the sake of descriptive convenience. Also, a case will be exemplified below how to hold and refer to image data for eight lines of an input image 1300 in a ring buffer for six lines when these image data are input as L1 to L8 in the raster-scan order.

The value of the ring counter attached to the ring buffer circulates from "0" to "5". The initial value of the ring counter is "5", and is incremented by one when data for one line is input. However, the counter value of the ring counter returns to "0" when it assumes the same value as the circulation count of the ring buffer. For example, since the circulation count of this ring buffer is "6", the counter value returns to "0" after "5".

Reference numeral 1301 denotes a state in which data for six lines L1 to L6 from the first line of the input image 1300 are fully loaded in the ring buffer, and the ring counter value is "5". Upon storing the next line, the ring counter is incremented to return to "0", and line L7 is loaded in the first row of the ring buffer. That is, the value of the ring counter indicates a row in the ring buffer, that stores the latest line (0 reference). This state is denoted by reference numeral 1302 in FIG. 13C.

In the state 1302, bands L2 to L7 can be referred to from the ring buffer, and its start row is a row of the value of the ring counter+1. Furthermore, upon storing next line L8, line L8 is loaded at the second row position, as shown in a state 1303, and the value of the ring counter becomes "1". In this case, as can be seen from FIG. 13D, lines L3 to L8 can be referred to, and the start row is also a row of the ring counter value+1.

If the circulation count of the ring buffer is matched with the number of lines of input image data, the previous line is never overwritten during processing for one page. That is, the ring buffer can serve as not only a band buffer but also a page buffer.

The minimum required height (circulation count) of the ring buffer of each processing node matches that of the unit calculation target image area (area 2205 in FIG. 22A) used when the processing node of the next layer executes unit calculation processing. That is, the height (circulation count) of each ring buffer can be determined based on the sizes of the convolution kernels of all the processing nodes connected after that processing node.

For example, in FIG. 7, in case of the memory area 703a, a larger value of the heights of unit calculation target image areas of convolution kernels 709a and 709d is determined as the minimum required height of the ring buffer of the memory area 703a. When the height is determined in this way, convolution calculations of both the convolution kernels 709a and 709d can be executed using pixel data stored in the ring buffer formed by the memory area 703a. Likewise, the minimum required heights of the memory areas 703b and 703c can be respectively determined based on the kernel sizes of convolution kernels 709b and 709e, and those of convolution kernels 709c and 709f. Also, the minimum required heights of memory areas 707a and 707b can be determined from the heights of unit calculation target image areas of convolution kernels 712a and 712b.

Note that the minimum required height for calculations in the next layer is determined in this case. Hence, ring buffers having larger heights may be used if there are other needs. For example, in FIG. 7, the memory areas 703a, 703b, 707a, and 707b have, as ring buffer heights, the minimum required heights for next layer calculations, which are specified by the kernel sizes. However, the memory area 703c stores feature detection data used by the CPU 68 for checking processing in addition to use for the next layer calculations. Hence, a page buffer having the same size as input image data is assigned to the memory area 703c. That is, the CPU 68 can check the existence of a detection target image with reference to not only feature data 713 of the final layer but also feature data of the first layer stored in the memory area 703c.

In this way, when the CNN processing unit of this embodiment is used, the feature planes of the intermediate layers can be assigned to buffers having optimal sizes (memory areas 703a, 703b, 703c, 707a, and 707b) in accordance with the network coupling state and intended purpose.

In the CNN calculation processing of this embodiment shown in FIG. 7, the memory areas 703a, 703b, 707a, and 707b used to hold the calculation results of the intermediate processing nodes are defined as band buffers. When output buffers of the intermediate processing nodes (intermediate buffers) are defined as band buffers, the memory use size is reduced compared to the conventional CNN calculation processing described using FIG. 4. However, the intermediate buffers defined as band buffers do not always minimize the total memory use size depending on the network configuration and calculation sequence. Such a case will be explained below.

FIG. 23 is a view showing an example when band buffers are assigned as intermediate buffers to CNN including N layers. In FIG. 23, each circle represents a logical processing node, and a rectangle attached to the right of each circle represents a buffer assigned to that processing node. In FIG. 23, frame buffers for one page (page buffers) are assigned to processing nodes of the zeroth layer as an input image and the N-th layer as an output layer, and band buffers are assigned to nodes of the remaining intermediate layers. In the present specification, an output result holding buffer of each intermediate layer is particularly called an intermediate buffer. A square attached to the left side of each of some circles exemplifies a convolution kernel of that processing node. However, only some convolution kernels are illustrated to avoid complexity of the drawing.

The node of the zeroth layer is an input layer, and the processing node is assigned for the purpose of convenience, as described above. However, this node does not execute calculation processing in practice, and simply indicates a state in which input image data is stored in an input buffer memory.

Buffers assigned to the final layer (N-th layer) are output buffers, and buffers having the same size as the input image size are assigned to two processing nodes in this example. Of course, the sizes of these output buffers need only be determined according to the convenience of, for example, a post-processing unit implemented by the CPU 68, which uses the calculation result of this CNN, independently of the convenience of convolution calculations. For example, if post-processing for calculating the barycenter of a certain range from the final output result and determining that a detection target exists at that coordinate position is to be executed, the size of each output buffer suffices to hold only the calculation result of the range required to calculate the barycenter.

In the CNN in FIG. 23, the intermediate buffers (output buffers of the first to (N−1)-th layers) are assigned as the same band buffers as those described in FIG. 7. The width of each band buffer is the same as the input image width, and the height is set to be the minimum required height specified by the convolution kernel sizes of processing nodes of the next layer to be connected (adjacent upper layer processing nodes). Note that the results of the intermediate layers are not used in post-processing for the sake of simplicity.

When all the intermediate buffers are assigned as band buffers in this way, the overall processing sequence of the CNN is attained by executing calculation processing for respective lines in turn while switching processing nodes. Assume that, for example, the height of the band buffer of the first processing node of the first layer is "5". When calculation processes for five lines are completed, and the results of these processes are stored, each processing node of the second layer which refers to the calculation results of this processing node can execute unit calculation processing for one line. Conversely, even one out of five lines in the band buffer cannot be discarded unless the processing of each processing node of the second layer is completed. For this reason, since there is no storage location for a new calculation result, the first processing node of the first layer cannot execute the next unit calculation. In this way, the first processing node of the first layer can start unit calculation processing for the next one line upon completion of the unit calculation processing of all processing nodes of the second layer, which require the calculation result of the first processing node.

Therefore, since the processing advances line by line in the overall CNN, all the intermediate buffers need to basically exist at the same time. Letting N: the total number of layers (except for the input layer), l=1, 2, . . . , N−1: a layer number variable (intermediate layer), $F_l$: the number of features of each layer $f=f_l=1, \ldots, F_l$: a feature number (feature of interest of a layer of interest), $f'=f_{l-1}$: a feature number of the previous layer, $I_X$, $I_Y$: an input image size (horizontal direction, vertical direction), $W_X(l,f,f')$, $W_Y(l,f,f')$: a kernel size (horizontal direction, vertical direction), $B_Y(l,f)$: a band buffer height, and $S_B$: a band intermediate buffer required size, a total size $S_B$ required when all the intermediate buffers are assigned as band buffers of a minimum required size can be calculated by:

$$B_Y(l, f) = \max(W_Y(l+1, f_{l+1}, f_l) | 1 \le l \le N-1, 1 \le f_{l+1} \le F_{l+1}) \quad (2)$$

$$S_B = I_X \times \sum_{l=1}^{N-1} \sum_{f=1}^{F_l} B_Y(l, f)$$

In the above calculations, the memory size required for network calculations is calculated by setting the size of the intermediate buffer required for each of all the processing nodes that configure the network calculations to be the data size required by each processing node connected after that processing node, and summing up the sizes of these intermediate buffers.

On the other hand, FIG. 24 shows an example when page buffers are used as intermediate buffers for the CNN having the same network configuration as that shown in FIG. 23. Buffers of the input and output layers are specified independently of the network configuration and calculation sequence as in FIG. 23, and page buffers are also assigned in FIG. 24.

In FIG. 24, page buffers having the same size as the input image size are assigned to processing nodes of the first to (N−1)-th layers. However, all of these page buffers need not exist at the same time.

Focusing an attention on respective nodes of the first layer, the calculation processing in each of these nodes is executed with reference to only the zeroth layer, that is, an input image. In this embodiment, since the input image data is fully stored on the memory, respective nodes can refer to data within required ranges when needed. Since the buffer for one page is prepared as the output storage buffer for each node, the calculation result can be stored any time regardless of overwriting of lines unlike in band buffers.

Focusing an attention on respective processing nodes of the second layer, these nodes refer to the processing results of the first layer. Therefore, after the respective processing nodes of the first layer complete the processing for one page, since required reference data are held as page data as in the input image, a desired range can be referred to when desired. The same applies to the subsequent layers. Basically, when processing of the previous layer is complete, and reference data for one page are stored, the nodes of the layer of interest can start processing.

Conversely, the processing nodes of each layer do not require the processing results of the second previous layer upon execution of calculation processing. That is, when a certain processing node starts calculation processing, if calculations for one page of all the processing nodes of the previous layer is complete, the intermediate buffers of the processing nodes of the layer before the previous layer can be released.

Therefore, when the respective processing nodes sequentially execute calculation processing for respective lines, only the processing nodes which belong to the first layer sequentially execute unit calculations first. After completion of the calculation processing for one page by all the processing nodes of the first layer, the processing nodes of the second layer start unit calculation processing. This processing is repeated for the next layer in turn. When the unit calculation processing sequence is designed in this way, if intermediate buffers exist in only two successive layers during one period, the calculations can be executed up to the final layer. More generally speaking, after the outputs of all processing nodes which belong to one layer are generated, the calculation processing of processing nodes which belong to the next layer is controlled to start, and after the outputs of all processing nodes which belong to the N-th layer are generated, intermediate buffer areas used by all the processing nodes which belong to the (N−1)-th layer are released and can be assigned to intermediate buffer areas of processing nodes which belong to the (N+1)-th layer and subsequent layers.

Every time the calculation processing of one layer is complete, the page buffers of the layer before that layer are re-used as intermediate buffers of the next layer, thus reducing the total intermediate buffer required size. This method will be referred to as a page buffer method hereinafter.

Letting $S_P$: a page intermediate buffer required size, the total required size upon configuring the intermediate buffers as page buffers (upon adopting the page buffer method) can be calculated by:

$$S_P = (I_X \times I_Y) \times (F_l, F_{l+1} | 1 \leq l \leq N-1) \quad (3)$$

This calculation calculates a total of sizes of calculation result data generated by all processing nodes which belong to a set of two successive layers in the network configuration for all sets, and uses a maximum one of the calculated total sizes as a required memory size.

As can be seen from equations (2) and (3), which of the band intermediate buffer required size $S_B$ and page intermediate buffer required size $S_P$ becomes smaller depends on the connection structure of logical processing nodes in the CNN network and the convolution kernel sizes of the respective nodes. In general, when the number of layers of a network is small, and the kernel sizes are also small, assignment based on the band buffer method is advantageous. However, when the number of layers is large, and the number of processing nodes which belong to each layer is relatively small, assignment based on the page buffer method is advantageous.

Normally, the upper limit size of a memory that can be used as intermediate buffers is constant as a system. Let M be this condition size. Particularly, in a dedicated pattern detection apparatus like in this embodiment, the memory size assigned to intermediate buffers is not always set to be as small as possible, and if it is equal to or smaller than the assignable size M, no problem is posed.

As described above, unit calculation processing sequences are different in the band buffer method and page buffer method. Particularly, in the page buffer method, one processing node can successively execute unit calculations for one page. With this sequence, an overhead upon switching processing nodes can be omitted depending on implementation, and the total calculation time may be slightly shortened compared to the band buffer assignment method. Therefore, when both $S_P$ and $S_B$ become equal to or smaller than M, the page buffer method is preferentially used in place of selecting smaller one.

Figure 11A:
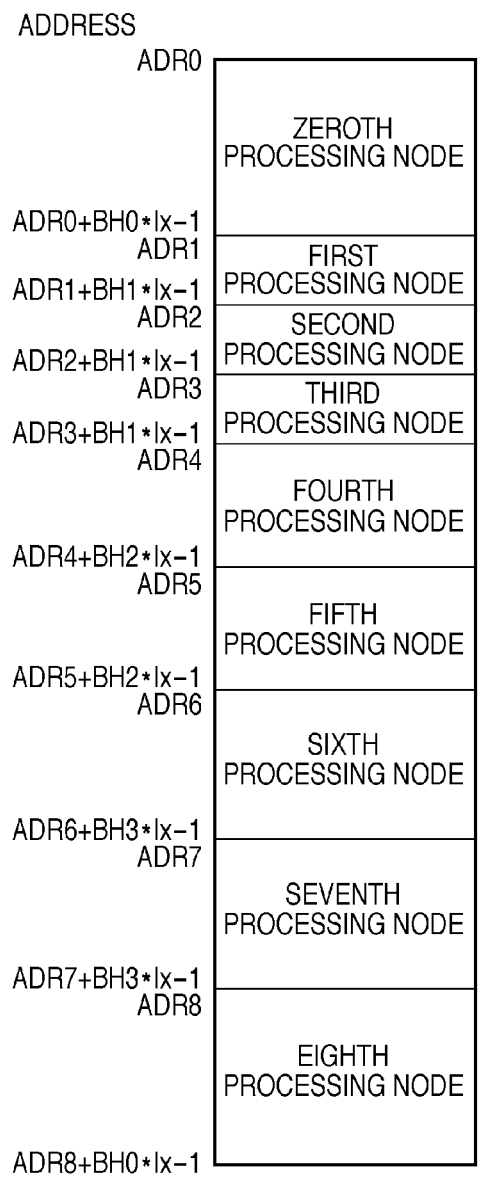
FIGS. 11A and 11B are views showing examples associated with memory allocations.
Figure 11B:
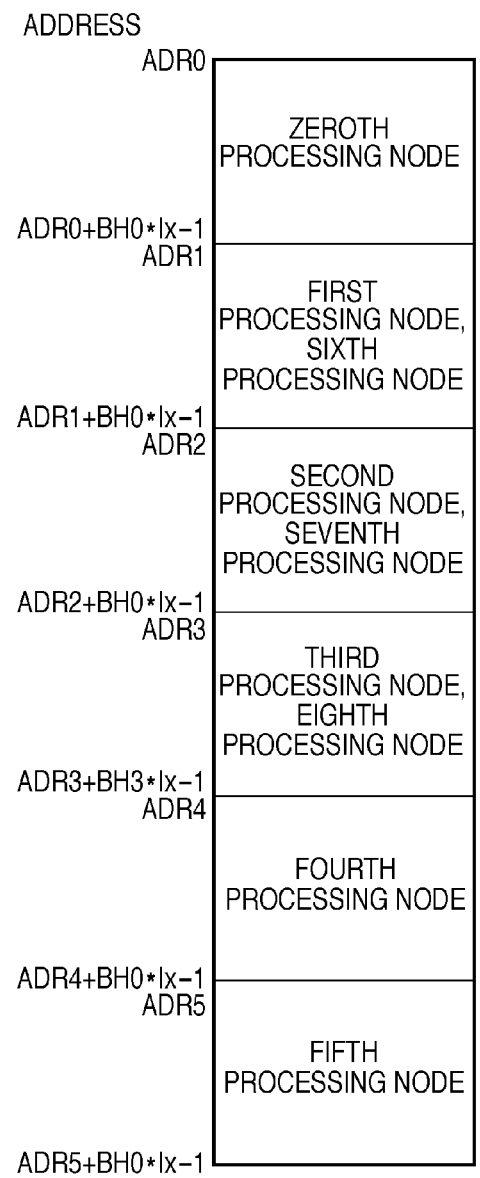

As shown in FIGS. 11A and 11B, in case of the page buffer assignment method, the output buffer of the final output layer can share an area with other intermediate buffers. Hence, the following equation (4) is used in place of equation (3):

$$S_P' = (I_X \times I_Y) \times \max(F_l, F_{l+1} | 1 \leq l \leq N) \quad (4)$$

Letting M' be an assignable size not only to intermediate buffers but also to the final output layer, M' is expressed by:

$$M' = M + (I_X \times I_Y) \times F_N \quad (5)$$

More specifically, whether or not it is possible to use assignment based on the page buffer method may be determined by using equation (4) in place of equation (3), and comparing it with M'. That is, in case of the page buffer method, a practically assignable size can be increased. In this way, the memory use efficiency can be further improved.

Figure 8A:
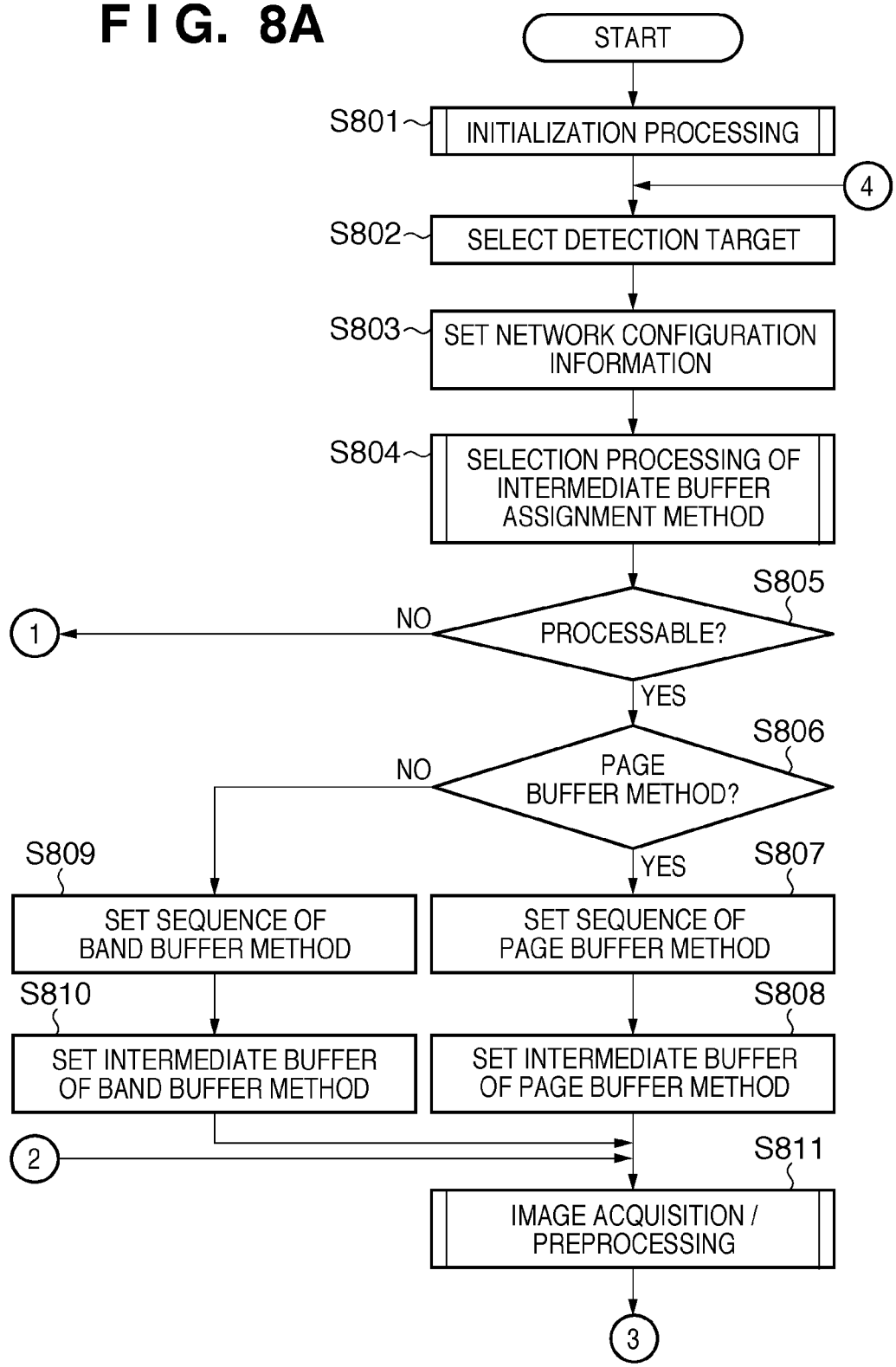

The calculation processing operation in the hierarchical network of this embodiment will be described in detail below with reference to the flowcharts shown in FIGS. 8A and 8B and FIGS. 26 and 27. FIGS. 8A and 8B are flowcharts showing a series of detection processing operations by the CPU 68. Processing based on software by the CPU 68 drives hardware processing circuit units such as the image input unit 61, CNN processing unit 63, and the like after execution of predetermined setting processing and the like.

In step S801, the CPU 68 executes various kinds of initialization processing of variables, registers, and the like, prior to the start of detection processing. The respective processing units initialize internal registers, memories, and the like in response to an initialization instruction from the CPU 68. Also, in this step, the CPU 68 executes initialization for setting the entire input image size area as a processing area. In the subsequent processes as well as this process, the CPU 68 can access the CNN processing unit 63 and other hardware circuit units via the bridge 65 and image bus 64, and can set data in predetermined registers and memories via the CPU bus access control unit 113. In this initialization processing, the CPU 68 loads coefficient data of convolution kernels of all processing nodes for all detection targets supported by this pattern detection apparatus to the weighted coefficient storage units 1205 (FIG. 12) in the calculation unit 101. This pattern detection apparatus can support various detection targets using identical hardware by replacing the weighted coefficients of the convolution kernels, sequence information, network configuration information, and the like, and sets of kernels for these targets are loaded in this step.

In step S802, the CPU 68 accepts a detection target of user's choice. In this step, the user selects a desired detection target to be detected from an image from all detection targets supported by this pattern detection apparatus.

After the detection target is determined, the CPU 68 sets network configuration information in the network configuration information setting unit 110 of the network configuration management unit 108 in step S803. The network configuration information is a table that designates the coupling relationship of the network, and is configured by a register file, RAM, or the like. The network configuration information also assumes different values according to detection targets as well as the weighted coefficients.

FIG. 9 is a table showing an example of the network configuration information, and expresses the configuration information of the CNN shown in FIG. 14. Referring to FIG. 9, "target processing node" corresponds to the logical zeroth to eighth processing nodes of the network shown in FIG. 14. Note that a logical processing node is a unit of logical calculation processing implemented by time-divisionally using the calculation unit 101. Note that the zeroth processing node is a processing node corresponding to the input image data plane, and does not execute any calculations in practice, although it is described as the zeroth processing node for the sake of convenience.

"Number of adjacent lower layer processing nodes" indicates the number of connections in a lower layer required when a processing node of interest executes calculations. For example, the fourth processing node is connected to three nodes in the lower layer. The network configuration management unit 108 controls memory accesses and calculations in accordance with the number of adjacent lower layer processing nodes.

"Adjacent lower layer processing node" is information that designates processing nodes of a lower layer required when a processing node of interest executes calculations. For example, the fourth processing node is connected to the first, second, and third processing nodes. That is, upon execution of the calculations of the fourth processing node, the calculation results of the first to third processing nodes are used as reference data.

"Calculation type" is information indicating the type of calculation to be executed, and in case of the CNN calculations, weighted coefficients are selected in accordance with the calculation type. That is, when the calculation unit 101 has the arrangement shown in FIG. 12, a calculation type number described in "calculation type" corresponds to a "kernel selection signal" used to select coefficients. In case of the CNN processing, the respective processing nodes execute convolution calculations using different weighted coefficients selected according to the "kernel selection signal".

"Reference data width" corresponds to the width of a convolution kernel corresponding to "calculation type", and "reference data height" corresponds to the height of the convolution kernel.

"Processing start line" represents an image position where the processing node of interest can make a valid calculation output. As described previously, since the convolution calculations are calculations for convoluting surrounding pixels within a range of the kernel size, when the kernel reference range protrudes outside the valid range of reference image data, that range becomes an area where a valid calculation result cannot be obtained. In the horizontal direction, the areas 2206 in FIG. 22A correspond to areas falling outside the valid range (invalid areas). Likewise, invalid areas also exist in the vertical direction. Such areas depend on the kernel size of the processing node, and are accumulated via layers. In the CNN of the pattern detection apparatus of this embodiment, since processing is executed for respective lines, calculations for lines of the invalid area are preferably skipped to speed up the entire processing. That is, since lines before "processing start line" form an invalid area for calculations in that processing node, the processing for that area can be skipped. In this connection, the number of the first line of an input image starts with "0". Likewise, an end line exists in addition to the start line, and has a line number obtained by subtracting "processing start line" from the number $I_Y$ of lines of the input image, and further subtracting "1" from the difference.

In this embodiment, each processing node calculates a maximum range that allows calculations with respect to the input image. A calculation range may be calculated back in turn from that to be used by processing nodes that finally use the calculation results toward previous layers. In this case, when the end line is also provided as information, more efficient calculations are made.

Figure 26:
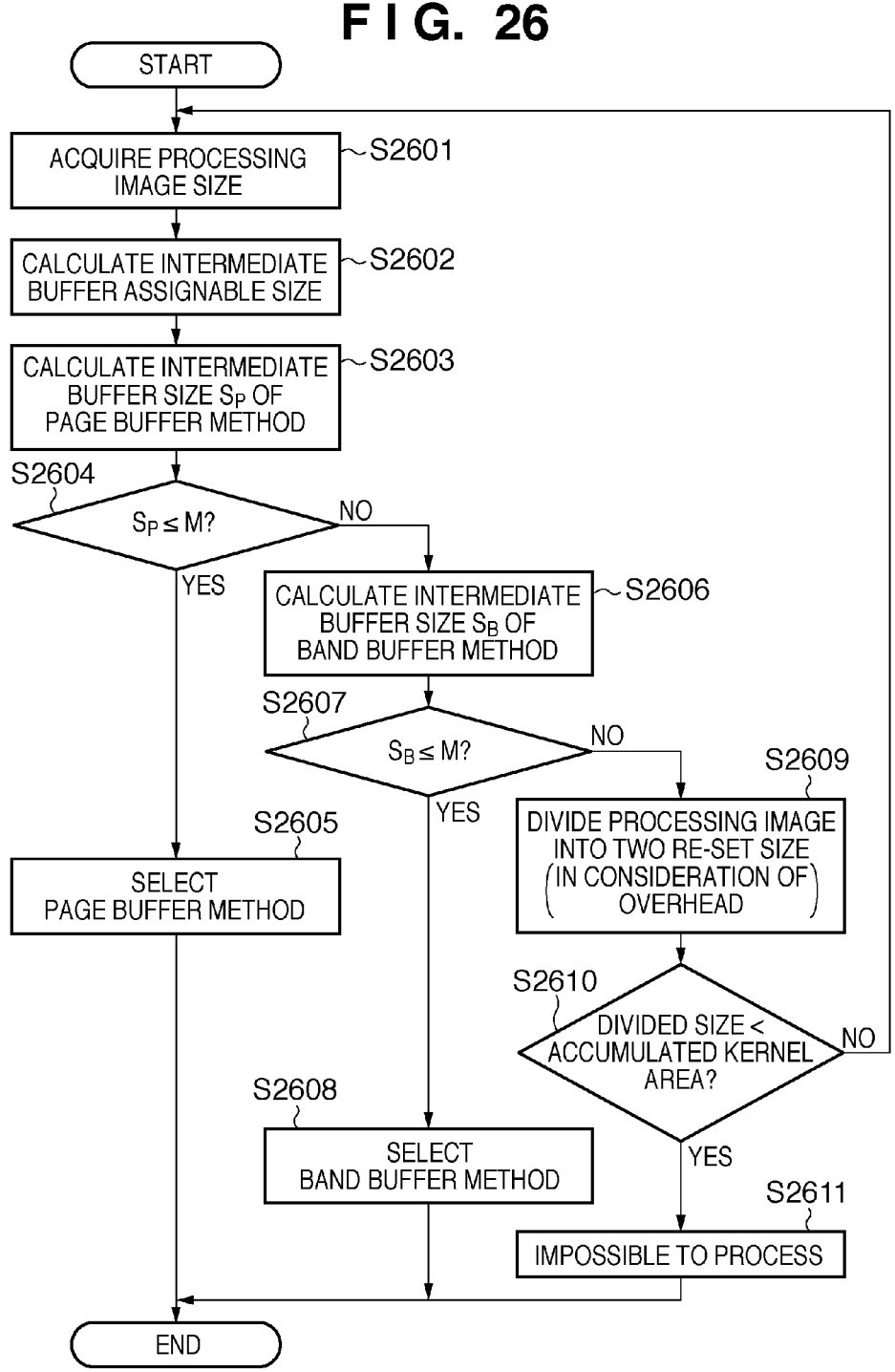
FIG. 26 is a flowchart for explaining selection processing of intermediate buffer assignment methods.
Figure 27:
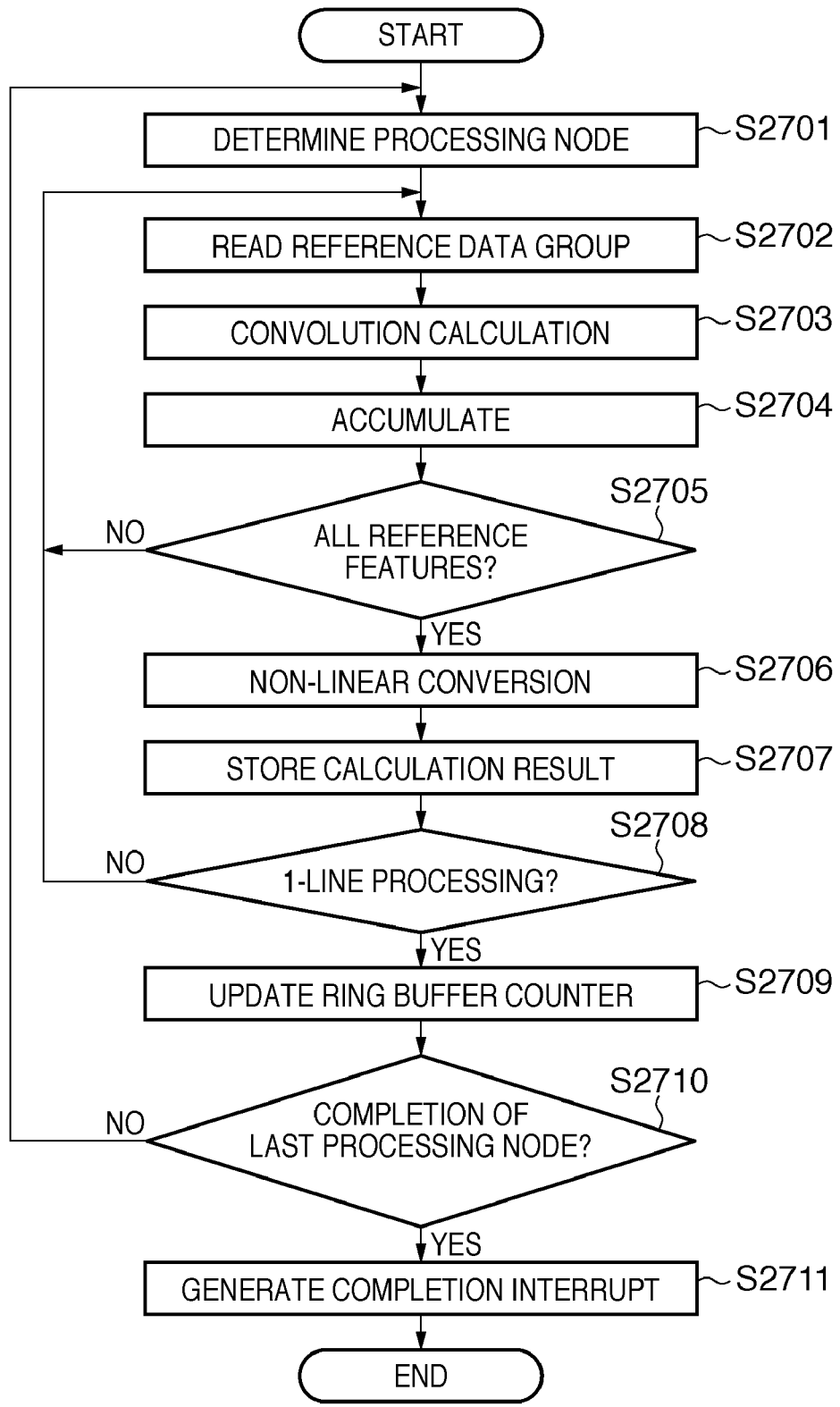
FIG. 27 is a flowchart for explaining CNN calculation processing.

In step S804, the CPU 68 selects the intermediate buffer assignment method. FIG. 26 is a flowchart showing details of this processing. In the intermediate buffer assignment method selection processing, the CPU 68 acquires the input processing image sizes $I_X$ and $I_Y$, which are set in advance, in step S2601. In step S2602, the CPU 68 calculates the size M available for intermediate buffers. This size M assumes a value obtained by subtracting the input image buffer size, output buffer size, and sizes required for other kinds of processing from the available size of the work memory 102.

In step S2603, the CPU 68 calculates the size $S_P$ required when the intermediate buffers are assigned using the page buffer method. This size $S_P$ can be calculated using equation (3) above. The CPU 68 confirms in step S2604 if $S_P \leq M$. If $S_P \leq M$, the CPU 68 selects the page buffer method as the current intermediate buffer assignment method in step S2605, thus ending this processing. Note that $S_P'$ and M' may be used as values to be used in place of $S_P$ and M, as described above, thus increasing the possibility of selection of the page buffer method.

On the other hand, if $M > S_P$, the process advances from step S2604 to step S2606. In step S2606, the CPU 68 calculates the intermediate buffer size $S_B$ required when the intermediate buffers are assigned using the band buffer method. This size can be calculated by equations (2) above. The CPU 68 confirms in step S2607 if $S_B \leq M$. If $S_B \leq M$, the CPU 68 selects the band buffer method as the current intermediate buffer assignment method in step S2608, thus ending this processing. In this way, according to this embodiment, of a plurality of types of buffer assignment methods, a buffer assignment method with which the total size of the required buffers becomes equal to or smaller than the memory size available for the intermediate buffers (equal to or smaller than M) is selected.

Figure 25F:
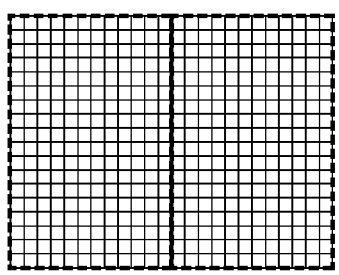

If both $S_P$ and $S_B$ are larger than M, there is no buffer assignment method, with which the total size of the required buffers becomes equal to or smaller than the memory size available for the intermediate buffers (equal to or smaller than M), of the plurality of types of buffer assignment methods. Therefore, this pattern detection apparatus cannot execute the calculation processing in this state. In this case, the CPU 68 re-sets a size obtained by dividing the original input image size into two as a new processing image size in step S2609. This division processing is executed in consideration of a kernel overhead, as shown in FIGS. 25A to 25F. FIG. 25A shows an original input image, and a bold frame indicates an accumulated kernel area 2501 in the final layer. Note that the accumulated kernel area is a reference range when the input image is reached by tracking back adjacent lower layer processing nodes in turn to enable the reference range of the final layer processing node.

A case will be examined below wherein the original input image is divided into two left and right areas, as indicated by dotted areas in FIGS. 25B and 25C. In order to enable the left and right dotted areas, data need to be input up to hatched areas in consideration of the accumulated kernel area 2501.

Therefore, two divided areas taking an overhead into consideration are obtained, as shown in FIGS. 25D and 25E. That is, these areas are obtained by adding the width of ½ (truncated in case of an odd value) of the accumulated kernel area 2501 to simply two divided areas of the input image size shown in FIG. 25A. By compositing areas within the two dotted frames of the divisional calculation results, as shown in FIG. 25F, a calculation result equivalent to that obtained by applying the CNN calculations to the original input image can be obtained. Note that a method of dividing and processing input data as described above may also be called tile processing.

In this embodiment, the horizontal division processing shown in FIGS. 25A to 25F is preferentially executed. This is because vertical division processing can reduce the intermediate buffer use size of the page method but the intermediate buffer use size of the band method remains the same. In the horizontal division, temporary total use sizes of both the methods are reduced. Since a dividable size is determined by the size of the accumulated kernel area (a size equal to or larger than the area is required), if no more horizontal division processing is allowed, the vertical division processing is executed. In this processing, a division counter of an initial value "1" is incremented every division, and the division direction is stored together.

The CPU 68 confirms in step S2610 that the divided size is larger than the accumulated kernel size, and repeats the processes from step S2601 again. When the divided size becomes unwantedly smaller than the accumulated kernel size even after using the vertical division processing, as described above, this CNN calculation apparatus cannot execute that detection processing. Hence, the process advances to step S2611, and the CPU 68 determines impossible processing. Since such impossibility is determined based on the kernel sizes of all processing nodes and assignable intermediate buffer size maximum value, a configuration that does not cause this situation is normally adopted.

Referring back to FIGS. 8A and 8B, the CPU 68 checks in step S805 if the impossible processing is determined in the selection processing in step S804. If the impossible processing is determined, the process jumps from step S805 to step S819 to execute end checking processing (to be described later). However, a configuration that does not cause such a situation is normally adopted.

The CPU 68 checks in step S806 if the method selected in the selection processing in step S804 is the page buffer method. If the page buffer method is selected, the process advances to sequence setting processing of the page buffer method in step S807 and intermediate buffer setting processing of the page buffer method in step S808. On the other hand, if the band buffer method is selected, the process advances to sequence setting processing of the band buffer method in step S809 and intermediate buffer setting processing of the band buffer method in step S810.

In the sequence setting processing of the page buffer method in step S807 or that of the band buffer method in step S809, the CPU 68 sets sequence information in the sequence information setting unit 111 of the sequence control unit 109. The sequence information is table information that specifies the sequence operations for respective calculation processing units (for respective lines in this embodiment) to be time-divisionally processed, and is held in the RAM or the like. Note that the sequence information is stored in the RAM 70, and the CPU 68 writes the sequence information in the CNN processing unit 63.

FIGS. 10A and 10B show examples of sequence information tables. FIG. 10A shows the sequence when the processing of the CNN network shown in FIG. 14 is executed by the band buffer method. FIG. 10B shows the sequence when the processing of the CNN network shown in FIG. 14 is executed by the page buffer method. "Sequence number" is a number indicating the sequence of processes for respective lines, and numerals need not be held in practice since it corresponds to an array Index of the table. "Processing node number" indicates a processing node number in FIG. 14, that is, a logical execution processing node corresponding to the sequence number. That is, in case of the sequence number "1", the calculation processing is executed for the first processing node, and in case of the sequence number "2", the line unit calculation processing of the second processing node is executed. "Processing line" indicates the position of a line to be output from the processing node of interest by the processing of the sequence number of interest. The processing line of each processing node starts in turn from the "processing start line" described using FIG. 9, and is incremented every time one-line processing is complete. Therefore, the current processing line may be stored in a register or the like without specifying numbers corresponding to the sequence numbers on the table unlike in this embodiment.

FIG. 10A shows an example of the sequence information table in case of the band buffer method, and the processing node is switched every time one-line unit processing is complete. For example, up to the sequence number "21", calculations of the processing node numbers "1" to "3" are executed, and the processing of the processing node number "4" starts at the sequence number "22". This is because a reference image required for the calculation processing for one line of the processing node number "4" has been calculated until the sequence number "21". In this way, in the band buffer method, since the line unit calculations are executed promptly in turn from the processing node which is ready to calculate, the buffers to be referred to can be sequentially released for respective lines. As a result, the intermediate buffers can be configured as ring buffers with the minimum required circulation count.

FIG. 10B shows an example of the sequence information table in case of the page buffer method. Unit calculations of a specific processing node are successively executed, and after the calculations of the specific processing node are completed for the entire valid area, calculations of the next processing node are started. In this way, in the CNN network shown in FIGS. 9 and 14, upon completion of the entire valid area calculations of, for example, the processing node numbers "4" and "5", the need for the intermediate buffer areas assigned to the outputs of the processing node numbers "1" to "3" can be obviated. Therefore, at this timing before completion of calculations up to the last layer, these buffer areas can be released and can be assigned for the outputs of the processing node numbers "7", "8", and "9".

In the intermediate buffer setting processing based on the page buffer method in step S808 or that based on the band buffer method in step S810, required intermediate buffer areas are assigned to the respective processing nodes. This processing is attained by setting values in register sets (ring buffer setting units 104-1 to 104-*n*) as many as the number of logical processing nodes. In case of the network structure shown in FIGS. 14 and 9, predetermined values need to be set in eight ring buffer setting units 104-1 to 104-8.

In each ring size setting unit 106, the height (the circulation count of the ring counter) of the ring buffer of the corresponding logical processing node is set. In case of the band buffer method, this circulation count corresponds to the maximum height of the convolution kernels of processing nodes of the next layer (adjacent upper layer processing nodes) which refer to the output from the processing node of interest. On the other hand, in case of the page buffer method, the height of the ring buffer set in the ring size setting unit 106 is the same as the number of lines of the input image (or the number of valid area lines of each processing node), and that ring buffer is used without being circulated in practice. In each offset address setting unit 107, the ring buffer start address of the corresponding processing node is set.

FIGS. 11A and 11B are the memory maps showing examples of the relationships among the processing nodes, offset addresses, and ring buffer heights upon implementation of the network shown in FIG. 14. FIG. 11A shows the memory map in case of the band buffer method, and FIG. 11B shows that in case of the page buffer method. ADRx (x: 0 to 8) corresponds to an offset address, and BHx (x: 0 to 3) corresponds to the height (circulation count) of the ring buffer. $I_X$ indicates the width of the input image data. In FIGS. 11A and 11B, an area for the zeroth processing node is a page buffer area used to hold the input image data. That is, BH0 is equal to the height $I_Y$ of the input image data. In this embodiment, larger one of the kernel sizes of the fourth and fifth processing nodes of the next layer (second layer), that is, a size for nine lines from the configuration information table in FIG. 9, is set in BH1. Likewise, a size for 13 lines is set in BH2, and a size for 17 lines is set in BH3. On the other hand, in case of the page buffer method, the heights of all areas are set to be BH0, and some areas are used by a plurality of processing nodes. In this embodiment, the memory 102 is divided into predetermined areas, and respective areas are used as ring buffers or frame buffers having different sizes.

With the aforementioned various kinds of setting processing, the execution sequence of the network calculation processing in the CNN calculation processing to be executed in step S814 (to be described later) is determined. That is, the execution sequence of the processing nodes in the network calculation processing is determined in accordance with the selected intermediate buffer assignment method (one of the band buffer method and page buffer method in the above example). Upon completion of various settings described above, the CPU 68 issues processing start instructions to the image input unit 61, preprocessing unit 62, and CNN processing unit 63 in turn from step S811.

In step S811, the image input unit 61 which received the processing start instruction from the CPU 68 acquires image data for one frame, and stores it in an internal buffer (not shown). Upon completion of storage of the image data, the image input unit 61 generates an image acquisition end interrupt to the CPU 68. Upon detection of this interrupt, the CPU 68 launches the DMAC 66 to transfer the acquired image data to an internal memory (not shown) of the preprocessing unit 62. Upon completion of transfer of the image data, the preprocessing unit 62 starts preprocessing. The preprocessing unit 62 corrects the contrast of the image data in accordance with, for example, contrast correction information designated in advance. Upon completion of the correction processing, the preprocessing unit 62 generates an interrupt to the CPU 68. Upon detection of the interrupt, the CPU 68 launches the DMAC 66 again to transfer the image data corrected by the preprocessing unit 62 to an input image buffer (corresponding to the zeroth processing node area in FIGS. 11A and 11B) of the memory 102 in the CNN processing unit 63.

In step S812, the CPU 68 sets the division processing counter. This counter assumes a value larger than 1 when the input image (processing image) is designated to be divided upon execution of the selection processing of the intermediate buffer assignment method in step S804 described above. The counter is set to be 1 without division. In step S813, the CPU 68 sets, as the processing area, the entire image area in case of no division or the first processing area (e.g., either of FIGS. 25D and 25E) in case of division.

In step S814, the CPU 68 sends a calculation start trigger to the CNN processing unit 63, thus starting the detection processing. Hardware processing in the CNN processing unit 63 will be described below with reference to the flowchart of FIG. 27.

In step S2701, the sequence control unit 109 determines a processing node. The sequence control unit 109 determines a processing node for every processing by tracing the sequence information table described in the aforementioned sequence information setting unit 111 from upper entries for respective line unit calculations. In case of the example shown in FIG. 10A, the sequence control unit 109 selects a processing number "1" in the first sequence. The sequence control unit 109 has a sequence counter which counts a sequence count, and counts up the sequence counter for each sequence unit (for each processing of a line unit in this case). This counter has an initial value "1", and can be used as "Index" of the sequence information table of FIG. 10A. That is, the sequence control unit 109 determines a processing node to be processed with reference to the sequence information table (FIG. 10A) using the sequence counter as an address.

In step S2702, reference data required for the calculations of the processing node are read out from the memory 102. More specifically, the network configuration management unit 108 selects the ring buffer setting unit 104 corresponding to the reference data in accordance with sequence instruction information output from the sequence control unit 109. That is, the network configuration management unit 108 selects one of the ring buffer setting units 104-1 to 104-*n*. For example, if the first processing node is selected in step S2701, the sequence control unit 109 determines "number of connected nodes=1", "connection source processing node=zeroth processing node", and "calculation type=1" in accordance with the contents of the network configuration information table shown in FIG. 9. The network configuration management unit 108 outputs a node selection signal to the selectors 1121 and 1122 in accordance with the contents of this network configuration information table to select the output from the ring buffer setting unit corresponding to the ring buffer to be referred to. For example, since the target processing node in the first sequence is the first processing node, the network configuration management unit 108 outputs a selection signal corresponding to the zeroth processing node as the adjacent lower layer node of the first processing node. The memory access control unit 103 generates a start address of the memory to be read out in accordance with the information of the selected ring buffer setting unit (in this case, the ring counter value and offset address value corresponding to the zeroth processing node).

Figure 15:
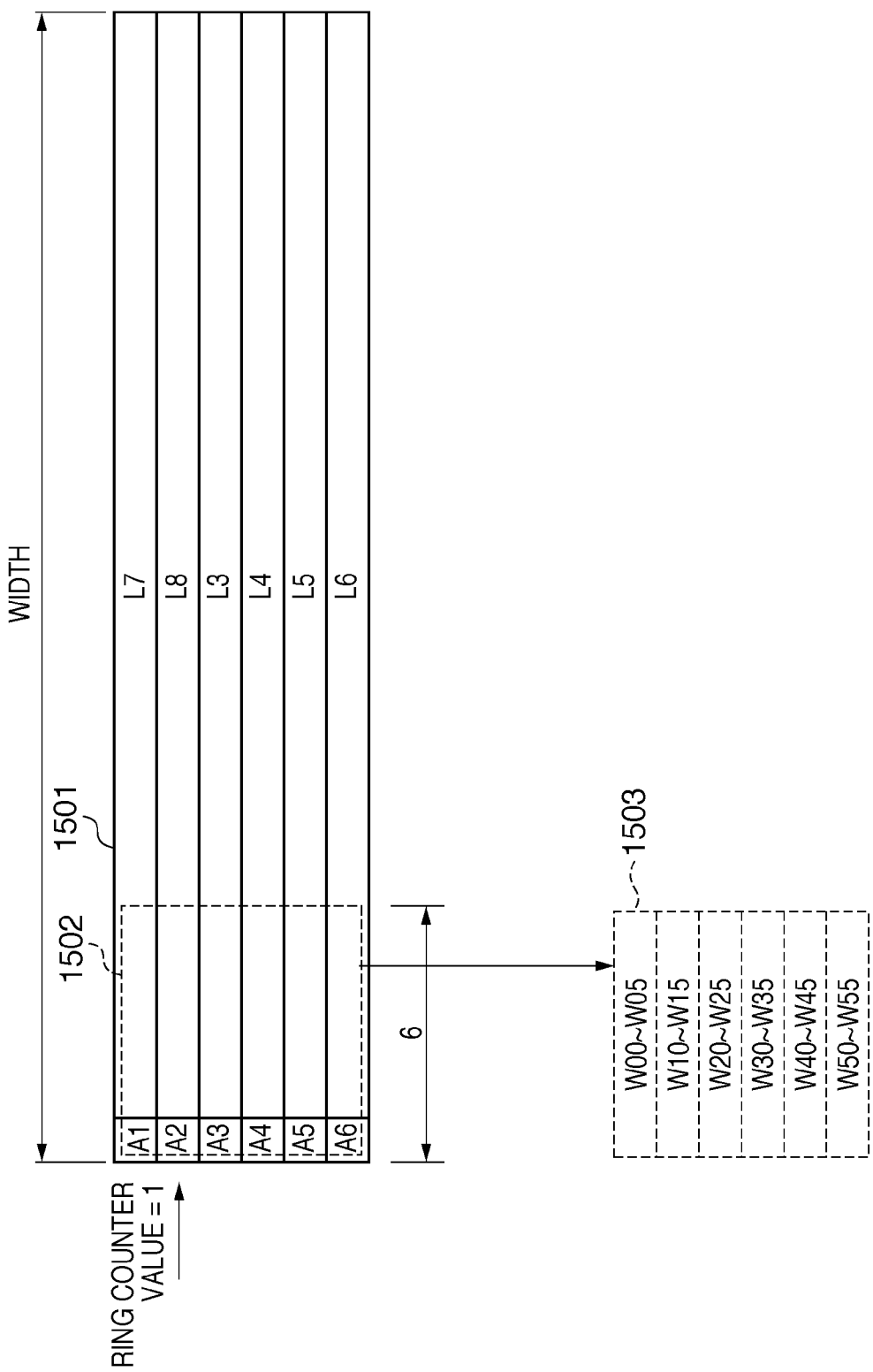
FIG. 15 is a view for explaining the read processing of a reference data group.
Figure 16:
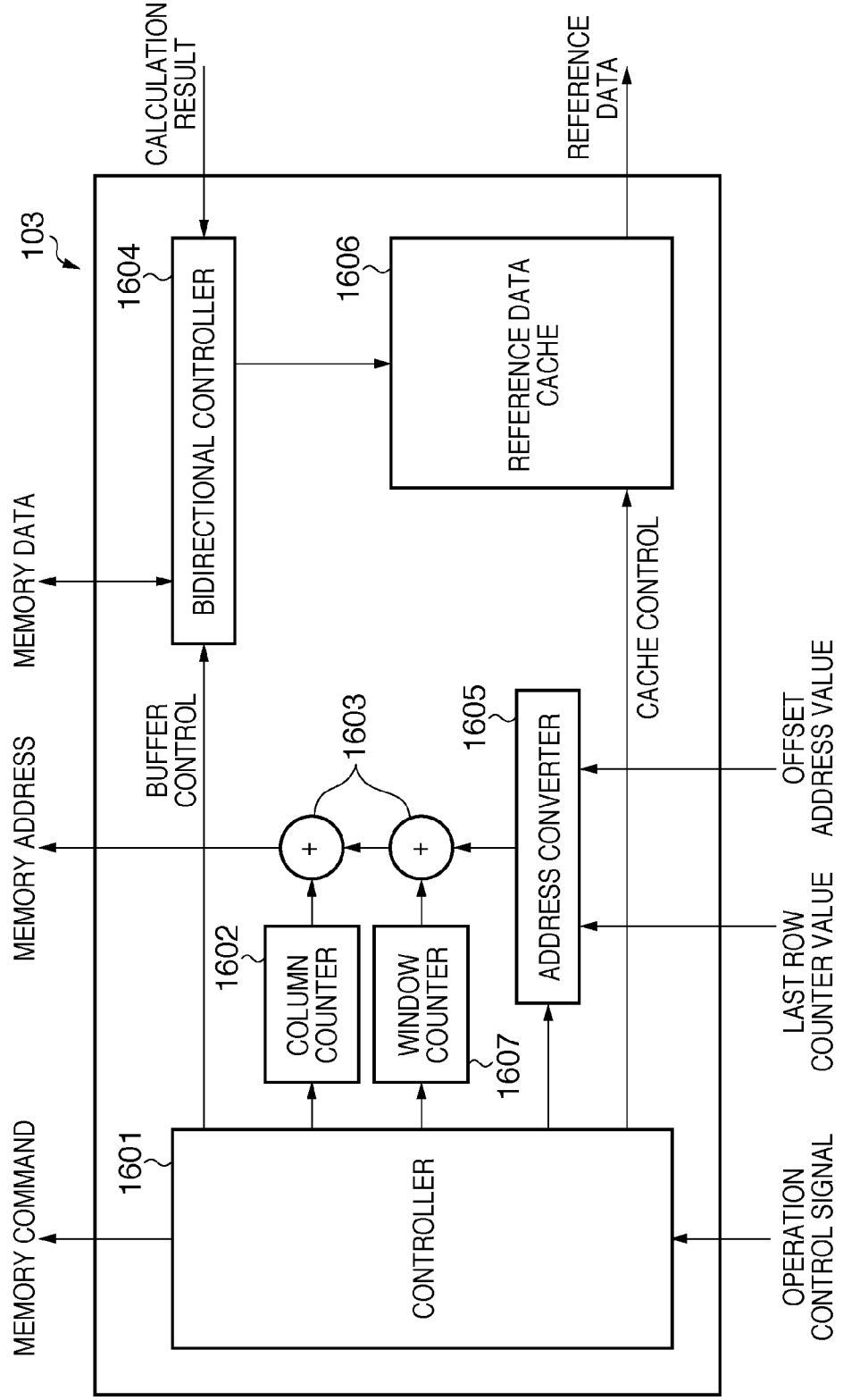
FIG. 16 is a block diagram for explaining the arrangement of a memory access control unit 103.

FIG. 16 is a block diagram for explaining the internal arrangement of the memory access control unit 103. FIG. 15 is a view for explaining the reference data read-out operation of the memory access control unit 103.

Referring to FIG. 15, reference numeral 1501 denotes a ring buffer in the band buffer method; 1502, a size corresponding to a reference window of a convolution kernel to be calculated; and 1503, a table for explaining the state of a weighted coefficient array set of the convolution kernel. A case in which the convolution kernel size is 6×6 will be described below. In the weighted coefficient array set 1503, W00 to W05 indicate a weighted coefficient array for a data array of the first row, W10 to W15 indicate that for a data array of the second row, and weighted coefficient arrays for respective data arrays are similarly listed. Upon execution of the convolution calculations, product-sum calculation processing of the coefficient values and reference data at corresponding positions is executed.

"WIDTH" indicates the width of a feature plane (i.e., it corresponds to the width $I_X$ of input image data in case of this embodiment), and L3 to L8 indicate line data of the third to eighth rows of the feature plane. A1 to A6 indicate start memory addresses of the corresponding lines.

In the memory access control unit 103, a controller 1601 generates command signals (Read/Write control signals) to the respective processing units and memory in accordance with an operation control signal output from the network configuration management unit 108. Reference numeral 1602 denotes a column counter, which indicates the position (horizontal position), on the data buffer, of the reference window 1502 (the range indicated by the dotted frame in FIG. 15) equal to the kernel size used in the current calculation. An adder 1603 adds row start addresses A1 to A6 generated by an address converter 1605, and counter values of the column counter 1602 and a window counter 1607 (to be described later), thereby generating memory addresses required to access data in respective rows in the ring buffer. Reference numeral 1607 denotes a window counter, which is a reference window width (corresponding to the kernel width) counter used to read out reference pixels which are successive in the horizontal direction with respect to respective rows of the reference range. The window counter 1607 is reset to "0" when it counts pixels corresponding to the reference window width. Note that the column counter 1602 and window counter 1607 are set in accordance with the contents of the network configuration information (FIG. 9) held by the network configuration management unit 108 every time the calculation type is changed.

More specifically, the memory address assumes a value obtained by adding the row start address generated by the address converter 1605, the counter value of the column counter 1602 which designates the column position of the reference window, and the output from the window counter 1607 which designates the pixel position within the reference window. The memory access control unit 103 sequentially outputs the memory addresses generated in this way to the memory 102.

For example, the address converter 1605 receives an offset address assigned to each processing node from the offset address setting unit 107, and the last row counter value from the ring counter 105. The address converter 1605 sequentially outputs start addresses A1 to A6 of respective rows in the buffer for the kernel height to have the row indicated by the last row counter value as the last position in the vertical direction. Note that the last row counter value matches the ring buffer value and indicates a position where the latest row is stored in the ring buffer in case of the band buffer method shown in FIG. 15. By calculating back from the last row counter value, addresses are output in the order of A4, A5, A6, A1, and A2 in turn from the start address of the row that stores L3, that is, A3, in the example of FIG. 15. Although not shown, in case of the page buffer method, a value obtained by adding ½ (truncated) of the kernel height (reference data height) to the processing line number shown in FIGS. 10A and 10B is used as the last row counter value for each sequence. Note that the ring counter is incremented upon inputting data for one line, and the address converter 1605 receives the last row counter value from the ring counter. Therefore, the address converter 1605 generates the start address of the next row every time it counts the kernel width.

A bidirectional controller 1604 is a buffer which executes bidirectional control of a memory data bus, and makes direction control of the data bus in accordance with a control signal output from the controller 1601. Reference numeral 1606 denotes a cache memory which temporarily holds reference data required for the convolution calculations (to be referred to as a reference data cache hereinafter). Reference data within the reference window obtained based on the aforementioned address conversion result are stored in the reference data cache 1606. The controller 1601 caches reference data successive in the column direction by controlling the reference data cache 1606 while updating the window counter 1607. In accordance with the output order of start addresses by the address converter 1605, the reference data cache 1606 stores data in the original normal line order.

Upon completion of the read-out processing of a reference data group from the memory 102 onto the cache by the memory access control unit 103, as described above, the process advances to step S2703. In step S2703, the calculation unit 101 starts the convolution calculation processing. The network configuration management unit 108 designates the weighted coefficients of the calculation unit 101 in accordance with the "calculation type" information (corresponding to the kernel selection signal) recorded in the configuration information table, and drives the calculation unit 101. The multiplier 1201 of the calculation unit 101 reads out reference data stored in the reference data cache 1606 of the memory access control unit 103, and executes the convolution calculation processing using the weighted coefficients designated by the calculation type information. In step S2704, the accumulation adder 1202 of the calculation unit 101 accumulates the calculation results of the convolution calculation processing.

It is checked in step S2705 if the convolution calculation processing is executed for reference data of all connection source processing nodes. If reference data, the convolution calculations of which are to be executed, still remain, the process returns to step S2702. For example, in the example shown in FIG. 9, when the processing target node is the fourth processing node, the number of connection source nodes is "3". In this case, the convolution calculation processes for the results of the first, second, and third processing nodes are executed in turn, and the calculation results are accumulated and held by the accumulation adder 1202. The read-out operation of reference data and calculation sequence for each processing node are the same as those in the aforementioned method. That is, the memory access control unit 103 reads out a required reference data group from the memory 102 onto the reference data cache 1606 in accordance with information such as a ring counter value, offset address value, and the like, which are different for respective processing nodes. The calculation unit 101 then executes convolution calculations for the cache data.

Upon completion of the calculations for all the connection source nodes, the process advances from step S2705 to step S2706. In step S2706, the non-linear processing unit 1203 non-linearly converts the output from the accumulation adder 1202.

In step S2707, the CNN processing unit 63 stores the non-linear conversion result obtained by the calculation unit 101 in the memory 102. More specifically, the network configuration management unit 108 selects the ring buffer setting unit 104 associated with the self processing node. For example, upon calculating the first processing node, the network configuration management unit 108 selects the ring buffer setting unit 104 corresponding to the first processing node. The memory access control unit 103 generates memory addresses to have, as a start address, a row next to the row indicated by the ring counter 105 of the designated ring buffer setting unit 104. Even in the page buffer method, the ring counter always indicates the latest stored row number. Note that the controller 1601 initializes the window counter 1607 at the time of the write operation. The memory access control unit 103 writes the calculation result at the generated start address. Upon completion of the write processing, the memory access control unit 103 increments the value of the column counter 1602 by one. The column counter 1602 is incremented every time one calculation result is written. Therefore, a reference data group of an area shifted by one column (one pixel) is read out at the time of the next processing.

Figure 17:
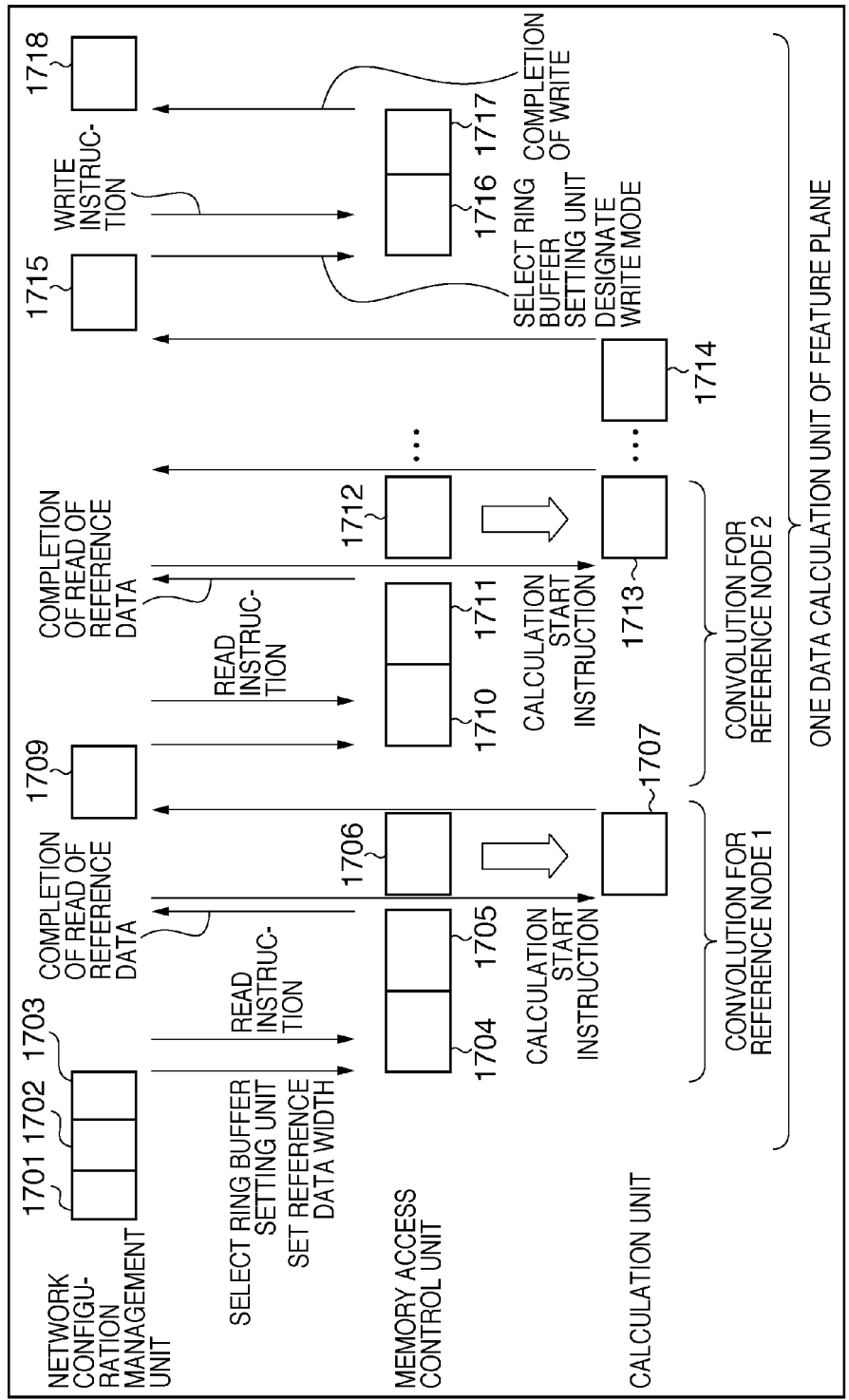
FIG. 17 is a chart for explaining the operation timings of CNN calculation units.

FIG. 17 is a timing chart illustrating the aforementioned calculation states in correspondence with the network configuration management unit 108, memory access control unit 103, and calculation unit 101. The upper part shows the operation of the network configuration management unit 108, and the memory access control unit 103 and calculation unit 101 execute their processing in accordance with instructions from the network configuration management unit 108.

As described above, in step S2701 the network configuration management unit 108 selects a processing node in accordance with sequence control instruction information from the sequence control unit 109 (1701: SELECT PROCESSING NODE). The network configuration management unit 108 sets the number of connected nodes with reference to the network configuration information table (1702: SET NUMBER OF CONNECTIONS). Subsequently, the network configuration management unit 108 notifies the memory access control unit 103 of information (ring counter value, offset address value, etc.) associated with the selected reference node, and instructs the unit 103 to read out reference data (1703: SELECT REFERENCE NODE 1). The memory access control unit 103 reads out reference data from the memory 102 using the notified ring counter value and offset address value, and caches them on the reference data cache 1606 (1704: GENERATE START LINE ADDRESS, 1705: ACQUIRE START LINE DATA). Upon completion of the read-out operation of the reference data by the memory access control unit 103, the network configuration management unit 108 instructs the calculation unit 101 to start calculations. The calculation unit 101 reads out the reference data cached on the reference data cache 1606 and executes the convolution calculation processing (1706: READ OUT CACHE DATA, 1707: CONVOLUTION CALCULATION PROCESSING). Upon completion of the convolution calculation processing of the calculation unit 101, the network configuration management unit 108 repeats the same processes (1709: SELECT REFERENCE NODE 2, 1710: GENERATE NEXT LINE ADDRESS, 1711: ACQUIRE NEXT LINE DATA, 1712: READ OUT CACHE DATA, 1713: CONVOLUTION CALCULATION PROCESSING) for the next reference node. Upon completion of the convolution calculations for all reference nodes, the network configuration management unit 108 controls the calculation unit 101 to execute non-linear conversion processing (1714: NON-LINEAR CONVERSION), to obtain a calculation result of one pixel on a feature plane. In order to store this calculation result in the memory 102, the network configuration management unit 108 notifies the memory access control unit 103 of information (ring counter value, offset address value, etc.) associated with the processing node, and instructs the unit 103 to write the calculation result. The memory access control unit 103 writes the calculation result for one row in the memory 102 using the notified ring counter value and offset address value (1715: SELECT PROCESSING NODE, 1716: GENERATE START LINE ADDRESS, 1717: STORE CALCULATION RESULT). Then, the memory access control unit 103 increments the column counter 1602 (1718: UPDATE COLUMN WINDOW).

After completion of the processing by repeating the aforementioned processes for one line (S2708), the process advances from step S2708 to step S2709. In step S2709, the network configuration management unit 108 increments the ring counter 105 of the ring buffer setting unit 104 corresponding to the calculation node during processing. The ring counter 105 is updated every time the processing for one line is completed. Note that the ring counter 105 is reset to zero when its count value becomes equal to the value of the ring size setting unit 106. That is, the count value of the ring counter 105 is circulated with reference to the ring size. However, in case of the page buffer method, since the value of the ring size setting unit 106 equals the input image size height, the ring counter is not reset to zero in practice. In this manner, by processing access to the memory 102 in accordance with the operation of the ring counter 105 for each logical processing node, predetermined areas on the memory 102 can be independently used as a plurality of ring buffers with different sizes (circulation counts). That is, areas on the memory maps shown in FIGS. 11A and 11B are respectively used as ring buffers.

The CNN processing unit 63 checks in step S2710 if the calculations of all the processing nodes are complete. In this case, whether or not the last sequence described in the sequence information table (FIG. 10A or 10B) is complete is checked. Note that the sequence control unit 109 may check completion by comparing a sequence counter (not shown) with the number of sequences, which is set in advance. Alternatively, the sequence control unit 109 may check completion by detecting predetermined "Termination" data, which is appended to the end of the table. If the calculations are not complete yet, the process returns from step S2710 to step S2701. The CNN processing unit 63 updates the sequence counter, and acquires the next processing node number to be processed with reference to the table corresponding to the count value. After the processing node is determined, the network configuration management unit 108 starts the processing for the next processing node in accordance with the sequence instruction information. Upon processing a different processing node, only various parameters associated with the ring buffer and calculations are different, and the same operations as in the aforementioned processes are repeated.

Note that the calculation processing progresses while storing feature data in the ring buffer in turn from lower layers, as shown in FIG. 10A or 10B. However, the sequences of the processing in the band buffer method and page buffer method are different.

By repeating the processes in steps S2701 to S2710, the calculations of feature planes based on the predetermined CNN network are executed while executing time-divisional processing for respective lines. Upon completion of all the sequences, the CNN processing unit 63 generates an interrupt to the CPU 68 in step S2711.

Referring back to FIGS. 8A and 8B, upon detection of the interrupt, the CPU 68 determines that the CNN calculation processing in step S814 is complete, and executes acquisition processing of an output image in step S815. In this processing, the CPU 68 launches the DMAC 66 to transfer the required calculation results from the CNN processing unit 63 to the RAM 70. In this embodiment, the output results of the eighth processing node of the last layer are adopted. Note that if the division processing counter set in step S812 is larger than "1" (when the input image is divided and processed), data is transferred to a position corresponding to an area determined in step S804 of output data storage areas assured on the RAM 70.

In step S816, the CPU 68 decrements the division counter. The CPU 68 repeats a series of processes from step S813 until the division counter becomes zero in step S817. As a result, the CNN calculation results corresponding to one frame of the input image are finally stored on the RAM 70.

After the calculation results are stored on the RAM 70, the CPU 68 executes checking processing in step S818. In this checking processing, the CPU 68 checks the detection state of a target using the feature data as the output of the last layer processing node stored on the RAM 70. For example, the checking processing for checking the presence/absence of the target using a method of, for example, binarizing the feature data by a predetermined threshold and acquiring the barycenter is executed.

In this way, the detection processing of one detection target with respect to the input image is complete. If the processing for the next input image or after a detection target is changed is not executed, this processing ends (step S819). On the other hand, if a detection target is changed, the process returns from step S820 to step S802 to re-set various parameters. By repeating the aforementioned processes, the weighted coefficients, network configuration information, and sequence information according to the detection target are respectively updated. Furthermore, the ring counters of the ring buffer setting units 104 are re-set according to these new weighted coefficients and network configuration information. As a result, the logical processing nodes map the memory 102 as ring buffers with different sizes according to the detection target upon execution of the processing.

On the other hand, if the detection target is not changed in step S820, the process advances to step S821. In steps S821 and S822, the CPU 68 initializes the ring counters 105 of the ring buffer setting units 104-1 to 104-n, the internal counter of the sequence control unit 109, and the like. The process returns to step S811 to restart the processing from acquisition of image data. That is, the CPU 68 executes the same detection processing for the next frame image.

As described above, according to the first embodiment, the ring buffer setting units 104 for controlling the ring buffers are provided in correspondence with the logical processing nodes, and the sizes (circulation counts) of the ring buffers are set according to the network configuration and purpose intended. In this arrangement, optimal one of a plurality of intermediate buffer assignment methods (page buffer method, band buffer method) can be selected based on the network configuration. With this arrangement, many types of hierarchical calculation processing such as convolutional neural networks and the like can be processed using identical hardware. Furthermore, since the priority order is given to the plurality of intermediate buffer assignment methods, the method that allows higher-speed calculations under identical conditions can be selected. When the size cannot fall within a predetermined range by all the intermediate buffer assignment methods, tile processing is executed by dividing the input image, thus coping with a larger number of types of hierarchical calculations.

<Second Embodiment>

In the first embodiment, the arrangement that allows setting the ring buffer sizes for all logical processing nodes has been explained. However, the present invention is not limited to this. For example, an arrangement that sets ring buffer sizes for respective layers may be adopted. The second embodiment will explain such arrangement.

Figure 18:
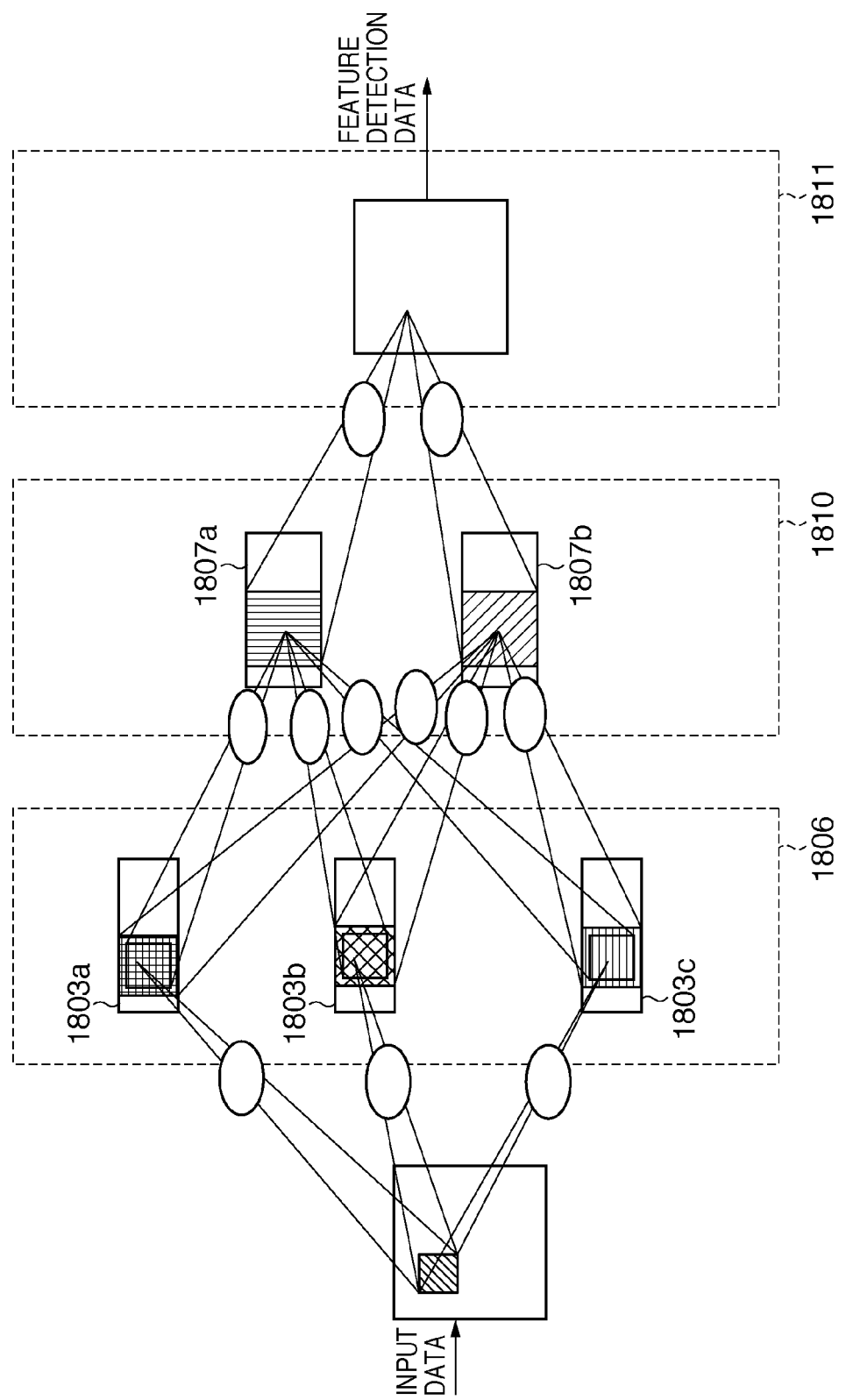
FIG. 18 is a diagram for explaining the network configuration of the CNN according to the second embodiment.
Figure 19:
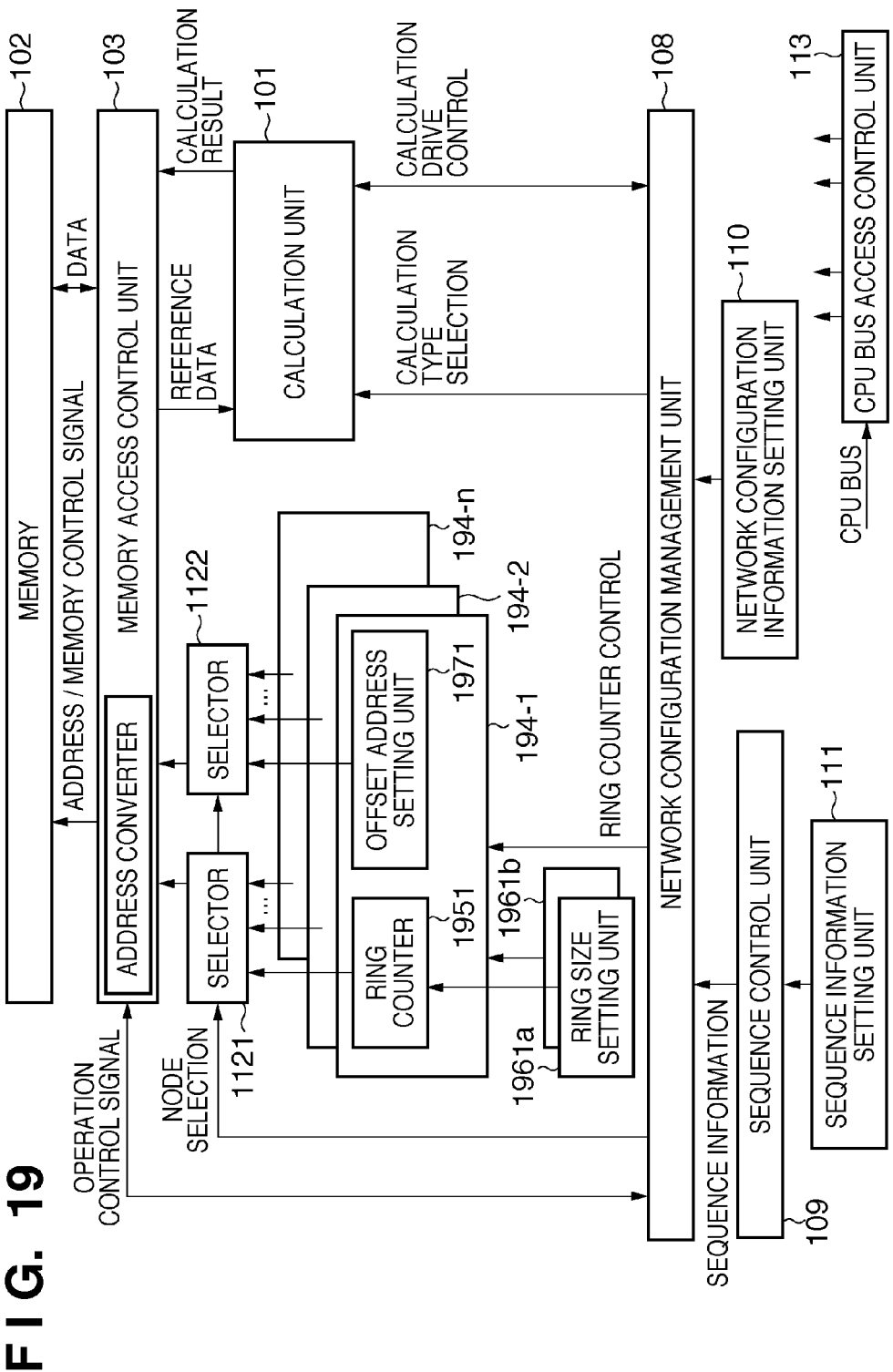
FIG. 19 is a block diagram for explaining the arrangement of a calculation processing apparatus according to the second embodiment.

FIG. 19 shows the arrangement of the CNN processing unit 63 when the ring buffer sizes are specified for respective layers. FIG. 18 shows an example of the configuration of a CNN network implemented by the CNN processing unit 63 shown in FIG. 19. FIG. 18 shows a state in which ring buffers have different sizes only for respective layers. That is, memory areas 1803a to 1803c used to store the calculation results of the first layer 1806, and memory areas 1807a and 1807b used to store the calculation results of the second layer 1810 are respectively configured by ring buffers of the same sizes. As can be seen from FIG. 18, the buffer size of the memory area 1803c is different from FIG. 7.

Differences from the first embodiment will be described below. The CNN processing unit 63 of the second embodiment has ring buffer setting units 194-1 to 194-n for respective logical processing nodes. Arbitrary one of the ring buffer setting units 194-1 to 194-n will be described as a ring buffer setting unit 194 hereinafter. Each ring buffer setting unit 194 comprises a ring counter 1951 and offset address setting unit 1971 corresponding to the ring counter 105 and offset address setting unit 107 of the first embodiment. However, the ring buffer setting unit 194 of the second embodiment does not have the ring size setting unit 106 of the ring buffer setting unit 104 of the first embodiment. Instead, the CNN processing unit 63 according to the second embodiment comprises ring size setting units for respective logical layers of the hierarchical network calculations. In the example of FIG. 19, the CNN processing unit 63 comprises two ring size setting units 1961a and 1961b to cope with calculations in which the number of layers is up to 3.

The ring size setting units 1961a and 1961b are respectively connected to the plurality of ring buffer setting units 194-l to 194-n. In this example, the ring size setting unit 1961a is connected to the plurality of ring buffer setting units 194 corresponding to the processing nodes of a first layer 1806. The ring size setting unit 1961b is connected to the plurality of ring buffer setting units 194 corresponding to the processing nodes of a second layer 1810. That is, the ring buffer setting units 194-1 to 194-n are grouped in correspondence with the ring size setting units 1961a and 1961b.

Figure 20:
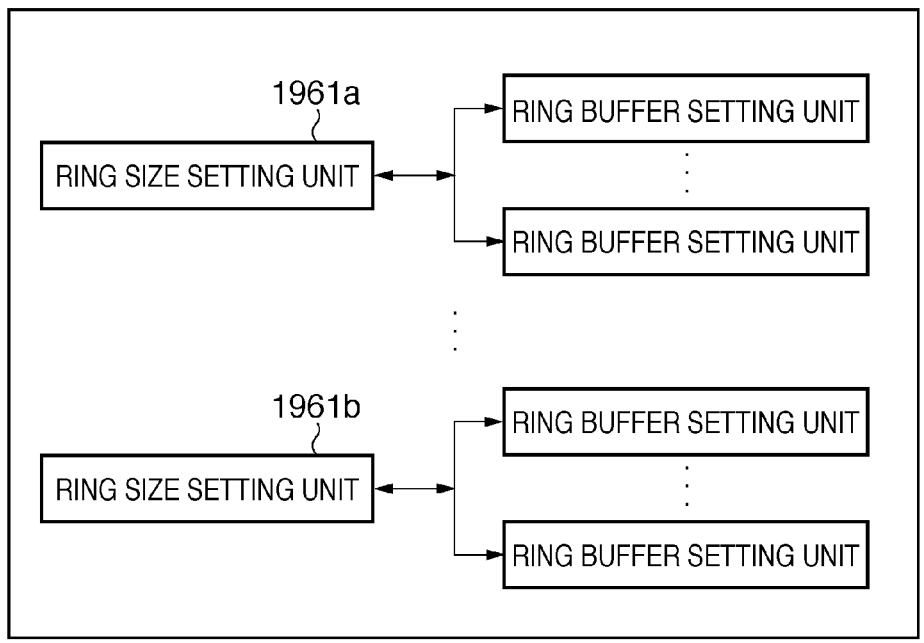
FIG. 20 is a view for explaining the relationship between ring buffer setting units and ring size setting units according to the second embodiment.

FIG. 20 shows the relationship between the ring size setting units 1961a and 1961b, and the ring buffer setting units 194. As the ring buffer setting units 194 used to control the ring buffers for the first layer 1806, those to which the ring size setting unit 1961a is connected are selected. On the other hand, as the ring buffer setting units 194 used to control the ring buffers for the second layer, those to which the ring size setting unit 1961b is connected are selected. During calculations, the ring buffer setting unit 194 corresponding to the processing node is selected according to management table information held by the network configuration management unit 108.

Differences from the first embodiment will be described below using FIGS. 8A and 8B in association with the processing sequence. In the second embodiment, the settings in the ring size setting units 1961a and 1961b are made for respective layers in steps S808 and 5810. The ring buffer setting units 194 corresponding to a network to be configured are selected from those which are grouped for respective layers, and offset addresses are set in the selected ring buffer setting units. In the network configuration of FIG. 18, values corresponding to the ring buffer heights of the first and second layers are respectively set in the ring size setting units 1961a and 1961b. In case of the page buffer method, this value is the same as the size of an input image (step S808). In case of the band buffer method, this value is a maximum height of convolution kernels of processing nodes of the next layer.

Since the subsequent processes are the same as those in the first embodiment, a repetitive description thereof will be avoided. Upon processing the network shown in FIG. 18, the network configuration management unit 108 advances the processing while selecting the ring buffer setting unit 194 corresponding to a predetermined logical processing node based on the aforementioned settings, thus executing processing for respective lines as in the first embodiment.

As described above, according to the second embodiment, since the ring size setting units are not provided for respective ring buffer setting units but they are provided for respective layers, the number of registers which configure the ring size setting units can be reduced.

<Third Embodiment>

Figure 21:
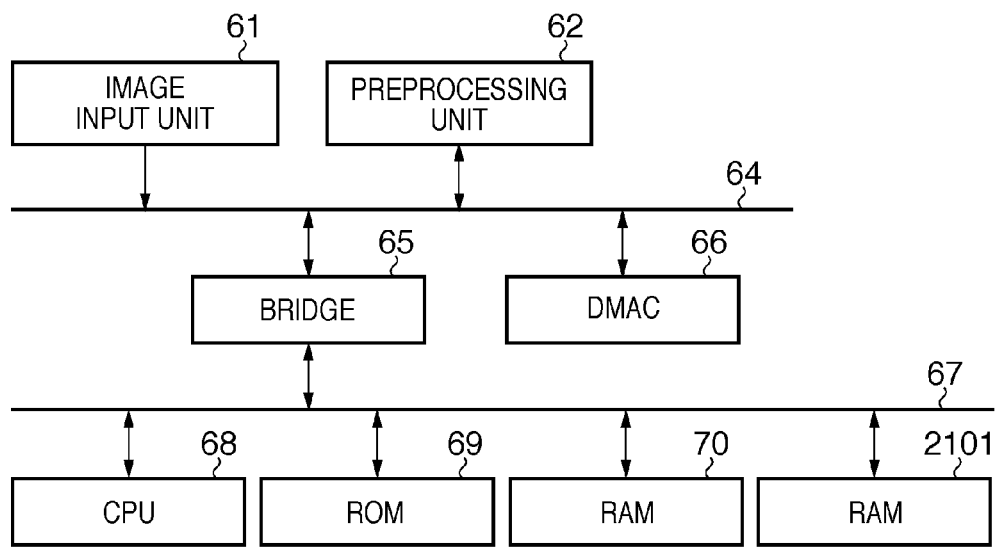
FIG. 21 is a block diagram for explaining the arrangement of the calculation processing apparatus according to the second embodiment.

In the description of the first and second embodiments, the CNN processing unit 63 is implemented by hardware. However, the present invention can also be applied to software implementation of the CNN processing unit 63. FIG. 21 shows an example of the arrangement in case of software implementation. In the arrangement shown in FIG. 21, the CNN processing unit 63 is removed from the arrangement shown in FIG. 6, and a RAM 2101 as a randomly accessible high-speed memory is added. Differences will be described below.

Upon reception of a completion interrupt from the preprocessing unit 62, the CPU 68 launches the DMAC 66 to transfer corrected image data stored in an internal memory of the preprocessing unit 62 to the RAM 2101. The CPU 68 executes processes in steps S2701 to S2710 shown in FIG. 27 for the image data stored in the RAM 2101 by software. In this case, the CPU 68 uses the RAM 2101 as a work memory required for the operation of CNN calculation processing. That is, the CPU 68 configures the memory map shown in FIG. 11A or 11B on the RAM 2101, and uses memory areas corresponding to processing nodes as ring buffers. Of course, the ring buffers can be used by selecting one assignment method from the band buffer method and page buffer method as in the hardware arrangement.

Note that the ring buffer setting units 104 and the like included in the CNN processing unit 63 of the first embodiment are defined as variables on software, and are assigned onto the RAM 70 in practice.

According to the third embodiment described above, the number of buffer memories required for the processing can be reduced as in hardware implementation of the CNN processing unit 63. In the arrangement shown in FIG. 21, the RAM 2101 can be implemented using a smaller memory size. Also, the same applies to a case in which the RAM 70 is used as a work memory without preparing any RAM 2101.

<Other Embodiments>

In the above embodiments, the method of using predetermined successive areas of the memory 102 while circulating these areas for respective lines using the ring counters has been explained. However, the present invention is not limited to such specific memory use method. For example, a method of executing processing while assigning discontinuous areas for respective predetermined processing units with reference to a memory address table corresponding to the ring counter may be used. That is, the ring buffer specified in the present invention is not limited to a ring buffer of the narrow sense or a cyclic buffer.

In the above embodiments, the case has been explained wherein logical processing nodes are time-divisionally processed for respective lines in accordance with the contents of the sequence information table. However, other methods may be applied. For example, a method of adaptively scheduling processing nodes to be executed in accordance with the use states of read and write buffers may be used. Particularly, upon selecting the page assignment method, implementation that switches a processing unit itself from a line unit to a page unit may be adopted.

The above embodiments have introduced an example in which the page buffer method is selected in preference to the band buffer method. Of course, the priority order is not limited to this. For example, upon attaching importance on the latency until the first line of a calculation result group data is output, the band buffer method may be preferentially used. Such selection is advantageous, for example, when the calculations are aborted before all the calculation results are output. Upon preferentially using the band buffer method, the processes in steps S2603 to S2605 may be replaced by those in steps S2606 to S2608 in FIG. 26.

The intermediate buffer assignment methods are not limited to those described above, and other buffer assignment methods may be used or a plurality of methods may used together. That is, a plurality of types of buffer assignment methods of assigning intermediate buffers used to hold calculation result data of respective processing nodes to these processing nodes are prepared, the memory sizes required for network calculations in association with these buffer assignment methods are calculated based on the configuration of the network calculations, and one of the plurality of types of buffer assignment methods is selected based on the calculated memory sizes.

When there is a plurality of buffer assignment methods with which the calculated required memory sizes become equal to or smaller than a memory size available for assignment of intermediate buffers of the memory 102, a buffer assignment method to be used is selected according to the predetermined priority order. When there is no buffer assignment method with which the calculated required memory size becomes equal to or smaller than a memory size available for assignment, the input data is divided and processed, as described above.

In the above embodiments, the feature extraction result is held at the same resolution as the input layer. However, the present invention can be similarly applied to a case in which feature planes are sub-sampled with respect to an input plane.

In the above embodiments, the case has been described wherein sequence control is executed for respective lines as most efficient processing units. However, the present invention is not limited to such specific processing unit. For example, the present invention can be applied to a case in which sequence control is executed for respective units not more than one line or for respective blocks, as is known to those who are skilled in the art.

The above embodiments have explained application to the convolutional neural network calculations. However, the present invention is not limited to such specific application. The present invention can be applied to various types of hierarchical calculation processing, which require a predetermined reference area. Furthermore, the present invention is not limited to two-dimensional calculations.

In the above embodiments, the case has been explained wherein the respective ring buffer setting units 104-1 to 104-$n$ are provided as registers. However, the ring buffer setting units may be shared as memories by other parameter memories and the work memory 102. In this case, circuit resources can be used more effectively. That is, a more flexible network configuration can be implemented.

In the above embodiments, the case has been described wherein all two-dimensional reference data are cached in the reference data cache 1606, and the calculation unit 101 is then launched. However, the present invention is not limited to this. For example, in case of the convolution calculations or the like, the calculation unit 101 may be controlled to be driven for each row in the reference window. In this case, upon completion of the read-out processing of reference data in the continuous column direction in response to a decrement of the window counter 1607, the calculation unit 101 is driven before the beginning of the reference data read-out processing of the next line. The calculation unit 101 executes convolution calculations for the readout data. Upon completion of calculations, the reference data read-out processing of the next line starts. The above processing is repeated. In this case, since the reference data cache size suffices to be equal that for the reference data width, hierarchical calculations can be implemented using a smaller cache size.

In the second embodiment, the case has been explained wherein the ring size setting units 1961$a$ and 1961$b$ are provided for respective layers. Instead, a configuration in which the ring buffer setting units 104 (or 194) are provided for respective layers may be used. In this case, each ring counter is controlled to be updated for each hierarchical processing unit. Although the operation sequences of logical processing nodes are limited (sequences for layer units need to be used), the circuit scale can be further reduced.

In the above embodiments, the case has been explained wherein the ring size setting units can arbitrary set the ring buffer sizes (when the ring buffers comprise registers or a RAM). However, ring buffer sizes may be set as fixed values in all or some of the ring size setting units.

The embodiments have been explained in detail. The present invention can adopt embodiments in the forms of, for example, a system, apparatus, method, program, storage medium, and the like. More specifically, the present invention may be applied to either a system constituted by a plurality of devices, or an apparatus consisting of a single device.

Note that the present invention includes a case wherein the aforementioned functions of the embodiments are achieved by directly or remotely supplying a software program to a system or apparatus, and reading out and executing the supplied program code by a computer of that system or apparatus. The program to be supplied in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a computer-readable storage medium for supplying the computer program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a homepage on the Internet using a browser on a client computer, and downloads the computer program of the present invention from the homepage onto a recording medium such as a hard disk or the like. In this case, the program to be downloaded may be a compressed file including an automatic installation function. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in cooperation with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the storage medium is written in a memory equipped on a function expansion board or a function expansion unit, which is inserted into or connected to the computer. In this case, after the program is written in the function expansion board or unit, a CPU equipped on the function expansion board or function expansion unit executes some or all of actual processes based on an instruction of that program.

According to the present invention, calculation processing to be executed by a plurality of processing nodes connected via a network structure such as CNN calculations or the like can be efficiently implemented using a limited memory size. Calculation processing by means of a network type calculator which connects calculation units via intermediate calculation results can be optimally processed by a limited memory size. That is, a variety of network type calculation processing can be implemented using hardware of the identical arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-250063 filed Sep. 26, 2007, which is hereby incorporated by reference herein in its entirety.

The invention claimed is:

1. A calculation processing apparatus for executing a network calculation by a network configured by connecting a plurality of logical processing nodes, the apparatus comprising:
a calculation unit configured to calculate respective sizes of
buffers used to hold calculation result data by the plurality of processing nodes required, said calculation unit performing such a calculation for each buffer assignment method of a plurality of buffer assignment methods of assigning memory areas as buffers, on the basis of a configuration of the network;

a selection unit configured to select one of the plurality of types of buffer assignment methods based on the respective sizes required for each of the plurality of buffer assignment methods calculated by said calculation unit; and an execution unit configured to control the respective processing nodes to execute calculations in the network calculations using the buffers assigned by the buffer assignment method selected by said selection unit.

2. The apparatus according to claim 1, wherein the network is a hierarchical network configured by hierarchically connecting a plurality of logical processing nodes.

3. The apparatus according to claim 1, further comprising an acquisition unit configured to acquire a memory size assignable to the buffers, wherein said selection unit selects the buffer assignment method with which the memory size calculated by said calculation unit is not more than the memory size acquired by said acquisition unit from the plurality of buffer assignment methods.

4. The apparatus according to claim 3, wherein when there are a plurality of buffer assignment methods with which the memory sizes calculated by said calculation unit are not more than the memory size acquired by said acquisition unit, said selection unit selects one of these buffer assignment methods based on a predetermined priority order.

5. The apparatus according to claim 3, further comprising a division unit configured to divide input data when there is no buffer assignment method with which the memory size calculated by said calculation unit is not more than the memory size acquired by said acquisition unit, wherein said selection unit selects the buffer assignment method to be used in the network calculation for each of divided input data.

6. The apparatus according to claim 1, wherein the plurality of buffer assignment methods include: a band buffer method which assigns a buffer used to hold some of calculation result data to one processing node; and a page buffer method which assigns a buffer used to hold all calculation result data for the input data to one processing node.

7. The apparatus according to claim 6, wherein said calculation unit calculates a memory size required for the network calculation when the band buffer method is used, by setting sizes of respective buffers of all the processing nodes which execute the network calculation to be a data size required by processing nodes connected after a processing node of interest, and summing the sizes of the buffers.

8. The apparatus according to claim 6, wherein said calculation unit calculates total sizes of the buffers required when all processing nodes which belong to each pair of adjacent layers in the configuration of the network hold all calculation result data for the input data, and sets a maximum size of the total sizes as a memory size required for the network calculation when the page buffer method is used.

9. The apparatus according to claim 6, wherein when the band buffer method is selected, said execution unit controls each of the plurality of processing nodes to execute a predetermined processing unit, and said execution unit controls the buffers assigned to the plurality of processing nodes as ring buffers which write calculation results by circulating a memory area corresponding to a size of a calculation result of the processing unit as a unit.

10. The apparatus according to claim 6, wherein when the page buffer method is selected, said execution unit controls processing nodes which belong to a next layer to start calculation processing after outputs of all processing nodes which belong to a current layer are generated, and said execution unit releases buffers used by all processing nodes which belong to an (N−1)-th layer after outputs of all processing nodes which belong to an N-th layer are generated, and assigns the released buffers to buffers of processing nodes which belong to an (N+1)-th layer and subsequent layers.

11. The apparatus according to claim 1, wherein the calculation to be executed by each processing node is a convolution calculation, and the network configures convolutional neural networks.

12. A calculation processing method for executing a network calculation by a network configured by connecting a plurality of logical processing nodes, the method comprising:

a calculation step of calculating respective sizes of buffers used to hold calculation result data by the plurality of processing nodes required, such a calculation being performed for each buffer assignment method of a plurality of buffer assignment methods of assigning memory areas as buffers, on the basis of a configuration of the network;

a selection step of selecting one of the plurality of types of buffer assignment methods based on the respective sizes required for each of the plurality of buffer assignment methods calculated in said calculation step; and an execution step of controlling the respective processing nodes to execute calculations in the network calculations using the buffers assigned by the buffer assignment method selected in said selection step.

13. A non-transitory computer-readable storage medium storing a computer program for making a computer execute a calculation processing method according to claim 12.

* * * * *